(12) United States Patent
Takahashi et al.

(10) Patent No.: US 12,528,733 B2
(45) Date of Patent: Jan. 20, 2026

(54) TRANSPARENT LAMINATE

(71) Applicant: Nippon Sheet Glass Company, Limited, Tokyo (JP)

(72) Inventors: Koji Takahashi, Tokyo (JP); Hisao Imai, Tokyo (JP); Kazuaki Oya, Tokyo (JP); Kiyomi Hayashi, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 589 days.

(21) Appl. No.: 17/788,810

(22) PCT Filed: Dec. 25, 2020

(86) PCT No.: PCT/JP2020/049037
§ 371 (c)(1),
(2) Date: Jun. 24, 2022

(87) PCT Pub. No.: WO2021/132696
PCT Pub. Date: Jul. 1, 2021

(65) Prior Publication Data
US 2023/0057817 A1    Feb. 23, 2023

(30) Foreign Application Priority Data

Dec. 27, 2019  (JP) ................................. 2019-239846
Dec. 27, 2019  (JP) ................................. 2019-239847
(Continued)

(51) Int. Cl.
*C03C 17/34*     (2006.01)
*B32B 7/12*      (2006.01)
(Continued)

(52) U.S. Cl.
CPC ............ *C03C 17/3405* (2013.01); *B32B 7/12* (2013.01); *B32B 17/10* (2013.01); *B32B 23/08* (2013.01);
(Continued)

(58) Field of Classification Search
None
See application file for complete search history.

(56) References Cited

U.S. PATENT DOCUMENTS 5,071,796 A * 12/1991 Jones ..................... C03C 3/087
                                                    501/69
6,103,372 A    8/2000 Sandor et al.
(Continued)

FOREIGN PATENT DOCUMENTS

CN    101044419 A    9/2007
CN    103468213 A    12/2013
(Continued)

OTHER PUBLICATIONS

Translation of Written Opinion from JPO in JP Application 2020/217997 (dated May 16, 2024).*
(Continued)

*Primary Examiner* — Ryan Crockett
(74) *Attorney, Agent, or Firm* — Birch, Stewart, Kolasch & Birch, LLP

(57) ABSTRACT

A cover member according to the present invention includes a transparent substrate that has a first main surface and a second main surface and a transparent first functional layer that is layered on the first main surface of the substrate.

18 Claims, 7 Drawing Sheets

(30) Foreign Application Priority Data

May 13, 2020 (JP) .................................. 2020-084822
Jun. 9, 2020 (JP) .................................. 2020-100559

(51) Int. Cl.
| | |
|---|---|
| *B32B 17/10* | (2006.01) |
| *B32B 23/08* | (2006.01) |
| *B32B 23/20* | (2006.01) |
| *B32B 27/36* | (2006.01) |
| *B64D 47/08* | (2006.01) |
| *B64U 101/30* | (2023.01) |
| *C03C 17/00* | (2006.01) |
| *C03C 17/30* | (2006.01) |
| *C03C 17/32* | (2006.01) |
| *C08L 83/10* | (2006.01) |
| *G02B 1/111* | (2015.01) |
| *G02B 1/18* | (2015.01) |

(52) U.S. Cl.
CPC .............. *B32B 23/20* (2013.01); *B32B 27/36* (2013.01); *C03C 17/007* (2013.01); *C03C 17/009* (2013.01); *C03C 17/30* (2013.01); *C03C 17/32* (2013.01); *C08L 83/10* (2013.01); *G02B 1/111* (2013.01); *G02B 1/18* (2015.01); *B32B 2255/26* (2013.01); *B32B 2255/28* (2013.01); *B32B 2264/1021* (2020.08); *B32B 2264/1022* (2020.08); *B32B 2307/412* (2013.01); *B32B 2307/416* (2013.01); *B32B 2307/724* (2013.01); *B32B 2307/728* (2013.01); *B32B 2551/00* (2013.01); *B32B 2605/18* (2013.01); *B64D 47/08* (2013.01); *B64U 2101/30* (2023.01); *C03C 2217/445* (2013.01); *C03C 2217/477* (2013.01); *C03C 2217/478* (2013.01); *C03C 2217/48* (2013.01); *C03C 2217/732* (2013.01); *C03C 2217/75* (2013.01)

(56) References Cited

U.S. PATENT DOCUMENTS

| | | | | |
|---|---|---|---|---|
| 2003/0030907 | A1* | 2/2003 | Ukuda | G02B 1/11 359/507 |
| 2006/0096320 | A1* | 5/2006 | Obana | C03C 17/256 427/180 |
| 2010/0009198 | A1 | 1/2010 | Kaneda et al. | |
| 2016/0209551 | A1 | 7/2016 | Bekku et al. | |
| 2017/0096574 | A1 | 4/2017 | Oya et al. | |
| 2018/0273791 | A1 | 9/2018 | Oya et al. | |
| 2019/0056529 | A1 | 2/2019 | Zhu et al. | |
| 2019/0172964 | A1 | 6/2019 | Hermes et al. | |
| 2020/0023618 | A1* | 1/2020 | Teranishi | B32B 17/10036 |
| 2020/0079185 | A1 | 3/2020 | Kondo et al. | |
| 2020/0399502 | A1* | 12/2020 | Nakamura | G02B 1/18 |
| 2021/0284862 | A1 | 9/2021 | Hanawa et al. | |
| 2024/0027652 | A1* | 1/2024 | Yamamoto | G02B 1/14 |

FOREIGN PATENT DOCUMENTS

| | | |
|---|---|---|
| CN | 205524925 U | 8/2016 |
| CN | 107839419 A | 3/2018 |
| CN | 108229374 A | 1/2019 |
| CN | 110099792 A | 8/2019 |
| EP | 1 304 366 A1 | 4/2003 |
| EP | 1 811 318 A1 | 7/2007 |
| EP | 3 505 345 A1 | 7/2019 |
| EP | 3 564 030 A1 | 11/2019 |
| JP | 6-306327 A | 11/1994 |
| JP | 2002-350966 A | 12/2002 |
| JP | 2004-117681 A | 4/2004 |
| JP | 2008-242187 A | 10/2008 |
| JP | 2010-228443 A | 10/2010 |
| JP | 2015-210495 A | 11/2015 |
| JP | WO2015/186360 A1 | 12/2015 |
| JP | 2017-144575 A | 8/2017 |
| JP | WO2017/183700 A1 | 10/2017 |
| JP | WO2017/183701 A1 | 10/2017 |
| JP | 2018-2865 A | 1/2018 |
| JP | 2018-81156 A | 5/2018 |
| JP | WO2018/110465 A1 | 6/2018 |
| JP | 2018-108677 A | 7/2018 |
| JP | 2018-150470 A | 9/2018 |
| JP | 2018-162050 A | 10/2018 |
| JP | 2019-11243 A | 1/2019 |
| JP | 2019-142196 A | 8/2019 |
| JP | 2019-523562 A | 8/2019 |
| KR | 10-2017-0096460 A | 8/2017 |
| KR | 10-2018-0027464 A | 3/2018 |
| WO | WO 2006/051604 A1 | 5/2006 |
| WO | WO 2008/023526 A1 | 2/2008 |
| WO | WO 2015/033701 A1 | 3/2015 |
| WO | WO 2018/123916 A1 | 7/2018 |

OTHER PUBLICATIONS

Chinese Office Action for Chinese Application No. 202080090517.8, dated Sep. 5, 2024, with English translation.
Japanese Office Action for Japanese Application No. 2019-239847, dated Jul. 31, 2024, with English translation.
Japanese Office Action for Japanese Application No. 2019-239847, dated Jul. 25, 2023, with an English translation.
International Search Report, issued in PCT/JP2020/049037, dated Mar. 30, 2021.
Written Opinion of the International Searching Authority, issued in PCT/JP2020/049037, dated Mar. 30, 2021.
Extended European Search Report for European Application No. 20906233.0, dated Jan. 8, 2024.
Japanese Office Action for Japanese Application No. 2019-239847, dated Feb. 13, 2024, with an English translation.
Chinese Office Action and Search Report for Chinese Application No. 202080090517.8, dated Dec. 14, 2023, with an English translation.
Japanese Office Action for Japanese Application No. 2020-217997, dated Jan. 16, 2024, with an English translation.
Japanese Office Action for Japanese Application No. 2019-239847, dated Apr. 15, 2025, with English translation.
Japanese Office Action for Japanese Application No. 2024-202464, dated Dec. 9, 2025.

* cited by examiner

TRANSPARENT LAMINATE

TECHNICAL FIELD

The present invention relates to a transparent laminate.

BACKGROUND ART

Transparent substrates such as glass plates and resin plate members are used for various uses and are sometimes used as cover members for protecting articles, for example (Patent Literature 1).

CITATION LIST

Patent Literature

Patent Literature 1: JP 2017-144575A

SUMMARY OF INVENTION

Technical Problem

In recent years, such cover members are required not only to protect articles but also to have other functions. The present invention was made to solve the above problem, and has an object of providing a cover member that can also be used for uses other than protecting an article.

Solution to Problem

Item 1: A transparent laminate including:
a transparent substrate that has a first main surface and a second main surface; and
a transparent first functional layer that is layered on the first main surface of the substrate.
Item 2: The transparent laminate according to Item 1, wherein the first functional layer has an antifog function.
Item 3: The transparent laminate according to Item 1 or 2, wherein the first functional layer has a surface roughness Ra of 1 to 1000 nm.
Item 4: The transparent laminate according to any one of Items 1 to 3,
wherein the first functional layer includes: a substrate film that has a first main surface and a second main surface;
a sticky layer that is layered on the second main surface of the substrate film; and
an antifog layer that is layered on the first main surface of the substrate film, and
the substrate film is fixed to the first main surface of the substrate via the sticky layer.
Item 5: The transparent laminate according to any one of Items 1 to 3,
wherein the first functional layer includes a sticky layer and an antifog layer, and
the antifog layer is fixed to the first main surface of the substrate via the sticky layer.
Item 6: The transparent laminate according to any one of Items 1 to 3,
wherein the first functional layer includes an antifog layer, and
the antifog layer is layered on the first main surface of the substrate.
Item 7: The transparent laminate according to any one of Items 4 to 6,
wherein the antifog layer includes a moisture absorbing layer that contains a hygroscopic resin material.
Item 8: The transparent laminate according to Item 7, wherein the antifog layer includes the moisture absorbing layer and a hydrophilic layer that is layered on the moisture absorbing layer and is hydrophilic.
Item 9: The transparent laminate according to Item 8, wherein the hydrophilic layer included in the antifog layer contains polyether-modified dimethylsiloxane represented by the following Formula (A),

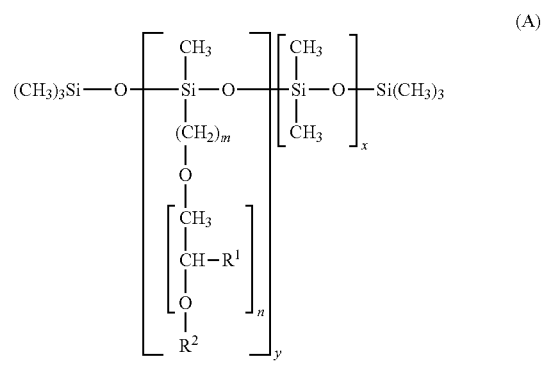

where m is an integer of 2 or more, and n, x, and y are integers of 1 or more independently of each other, and $R^1$ is a hydrogen atom or a methyl group, and $R^2$ is an alkyl group having 1 to 3 carbon atoms.
Item 10: The transparent laminate according to Item 9, wherein in the Formula (A),
m is an integer of 1 to 3,
n is an integer of 3 to 600,
y/(x+y) is 0.01 or more and less than 1, and
an average molecular weight is 3,000 to 300,000.
Item 11: The transparent laminate according to Item 7, wherein, in the antifog layer, a hydrophilizing agent is dispersed in the moisture absorbing layer.
Item 12: The transparent laminate according to Item 11, wherein the antifog layer contains a solvent having a boiling point that is at least 100° C. and not higher than 300° C.
Item 13: The transparent laminate according to Item 12, wherein the solvent has an alcohol group.
Item 14: The transparent laminate according to any one of Items 11 to 13,
wherein the antifog layer has an antifog property after a cloth impregnated with alcohol is rubbed against the antifog layer a predetermined number of times.
Item 15: The transparent laminate according to any one of Items 11 to 14,
wherein the antifog layer has an antifog property after undergoing a predetermined constant-temperature constant-humidity test.
Item 16: The transparent laminate according to any one of Items 11 to 15,
wherein the antifog layer is constituted by a single layer.
Item 17: The transparent laminate according to any one of Items 1 to 6,
wherein the first functional layer contains an inorganic compound as a main component.
Item 18: The transparent laminate according to Item 17, wherein the transparent laminate has a visible light transmittance of 85% or more, and
the transparent laminate has a visible light reflectance of 10% or less.

Item 19: The transparent laminate according to Item 17 or 18,
  wherein a difference between the transmittance of the substrate and the minimum transmittance of the transparent laminate in a visible light wavelength range is 5% or less.

Item 20: The transparent laminate according to any one of Items 17 to 19,
  wherein a difference between the reflectance of the substrate and the maximum reflectance of the transparent laminate in a visible light wavelength range is 5% or less.

Item 21: The transparent laminate according to any one of Items 17 to 20,
  wherein the reflectance of the transparent laminate in a visible light wavelength range satisfies the following formula:

$$1 \leq \text{maximum reflectance}/\text{minimum reflectance} \leq 1.5.$$

Item 22: The transparent laminate according to any one of Items 17 to 21,
  wherein the first functional layer contains inorganic microparticles and an inorganic binder.

Item 23: The transparent laminate according to Item 22,
  wherein the thickness of the first functional layer is no greater than twice the particle diameter of the inorganic microparticles.

Item 24: The transparent laminate according to Item 22 or 23,
  wherein the inorganic microparticles are formed of $SiO_2$.

Item 25: The transparent laminate according to Item 24,
  wherein the $SiO_2$ content in the first functional layer is 28 mass % or less.

Item 26: The transparent laminate according to any one of Items 22 to 25,
  wherein the first functional layer contains photocatalyst microparticles.

Item 27: The transparent laminate according to Item 26,
  wherein the photocatalyst particles are formed of an oxide or oxynitride that contains any of titanium, tungsten, and iron as a main component.

Item 28: The transparent laminate according to Item 26 or 27,
  wherein the content of the photocatalyst particles is 40 mass % or less.

Item 29: The transparent laminate according to any one of Items 26 to 28,
  wherein the content of the inorganic binder is 30 mass % or more.

Item 30: The transparent laminate according to any one of Items 17 to 29,
  wherein the first functional layer has an antifog property after being immersed in water for a predetermined period of time.

Item 31: The transparent laminate according to any one of Items 17 to 30,
  wherein the first functional layer has an antifog property after a cloth impregnated with alcohol is rubbed against the first functional layer a predetermined number of times.

Item 32: The transparent laminate according to any one of Items 17 to 31,
  wherein the first functional layer has an antifog property when irradiated with ultraviolet rays after a cloth impregnated with alcohol is rubbed against the first functional layer a predetermined number of times.

Item 33: The transparent laminate according to any one of Items 17 to 32,
  wherein the first functional layer has an antifog property when irradiated with ultraviolet rays after undergoing a predetermined constant-temperature constant-humidity test.

Item 34: The transparent laminate according to any one of Items 17 to 33,
  wherein the transparent laminate is used as a cover member for a monitoring camera that is installed outdoors.

Item 35: The transparent laminate according to Item 34,
  wherein the monitoring camera includes an ultraviolet ray irradiation device.

Item 36: The transparent laminate according to Item 34 or 35,
  wherein the first functional layer is arranged to face the monitoring camera.

Item 37: The transparent laminate according to Item 34,
  wherein the first functional layer is arranged to face the side opposite to the monitoring camera.

Item 38: The transparent laminate according to any one of Items 2 to 10, further including:
  a second functional layer that is layered on the first functional layer and is permeable to moisture.

Item 39: The transparent laminate according to Item 38,
  wherein the first functional layer is formed from an organic-inorganic composite material, and
  the refractive index of the second functional layer is lower than the refractive index of the first functional layer.

Item 40: The transparent laminate according to Item 38 or 39,
  wherein the second functional layer is a single layer.

Item 41: The transparent laminate according to Item 40,
  wherein the refractive index of the second functional layer is 1.10 to 1.45.

Item 42: The transparent laminate according to Item 41,
  wherein when the refractive index of the first functional layer is represented by X, the refractive index of the second functional layer is $\sqrt{X} \pm 0.1$.

Item 43: The transparent laminate according to Item 42,
  wherein the second functional layer contains hollow particles and a binder that binds the hollow particles together.

Item 44: The transparent laminate according to Item 43,
  wherein the refractive index of the hollow particles is 1.15 to 2.70.

Item 45: The transparent laminate according to Item 43 or 44,
  wherein the hollow particles have an average particle diameter of 20 to 100 nm.

Item 46: The transparent laminate according to any one of Items 43 to 45,
  wherein the hollow particles are selected from the group consisting of silica, magnesium fluoride, alumina, aluminosilicate, titania, and zirconia.

Item 47: The transparent laminate according to any one of Items 38 to 46,
  wherein the second functional layer contains a solvent having a boiling point that is at least 100° C. and not higher than 300° C.

Item 48: The transparent laminate according to Item 47,
  wherein the solvent contains 3-methoxy-3methyl-1-butanol as a main component.

Item 49: The transparent laminate according to Item 47 or 48,
wherein the second functional layer contains the solvent at a concentration of 1 ppb or more and 5 g/cm$^3$ or less.

Item 50: The transparent laminate according to any one of Items 43 to 49,
wherein the binder contains at least one of polysilsesquioxane and silica.

Item 51: The transparent laminate according to any one of Items 43 to 50,
wherein the second functional layer has a void ratio of 0 to 70 vol %.

Item 52: The transparent laminate according to Item 38 or 39,
wherein the second functional layer includes a first layer that is layered on the first functional layer and a second layer that is layered on the first layer and has a lower refractive index than the first layer.

Item 53: The transparent laminate according to Item 52,
wherein the first layer has a refractive index of 1.35 to 1.55, and
the second layer has a refractive index of 1.10 to 1.25.

Item 54: The transparent laminate according to Item 53,
wherein the second layer contains hollow particles and a binder that binds the hollow particles together.

Item 55: The transparent laminate according to Item 54,
wherein the hollow particles have a refractive index of 1.15 to 2.70.

Item 56: The transparent laminate according to Item 54 or 55,
wherein the hollow particles have an average particle diameter of 20 to 100 nm.

Item 57: The transparent laminate according to any one of Items 54 to 56,
wherein the hollow particles are selected from the group consisting of silica, magnesium fluoride, alumina, aluminosilicate, titania, and zirconia.

Item 58: The transparent laminate according to any one of Items 54 to 57,
wherein the binder contains at least one of polysilsesquioxane and silica.

Item 59: The transparent laminate according to any one of Items 54 to 58,
wherein the second layer has a void ratio of 0 to 70 vol %.

Item 60: The transparent laminate according to any one of Items 54 to 59,
wherein the first layer contains the binder of the second layer.

Item 61: The transparent laminate according to any one of Items 38 to 60,
wherein the second functional layer has a flexural modulus of elasticity of 1 to 10 GPa.

Item 62: The transparent laminate according to any one of Items 38 to 61,
wherein the flexural modulus of elasticity of the second functional layer overlaps the flexural modulus of elasticity of the first functional layer.

Item 63: The transparent laminate according to any one of Items 38 to 62,
wherein a difference between the linear expansion coefficient of the first functional layer and the linear expansion coefficient of the second functional layer is 50 ppm/° C. or less.

Item 64: The transparent laminate according to Item 1,
wherein the first functional layer has an antireflection function.

Item 65: The transparent laminate according to Item 64,
wherein the first functional layer is formed from a film in which a sticky layer, a substrate sheet, and an antireflection layer are layered in this order.

Item 66: The transparent laminate according to Item 65,
wherein the antireflection layer included in the first functional layer has a refractive index of 1.10 to 1.45.

Item 67: The transparent laminate according to Item 65 or 66,
wherein the antireflection layer included in the first functional layer contains hollow particles and a binder that binds the hollow particles together.

Item 68: The transparent laminate according to Item 67,
wherein the hollow particles have a refractive index of 1.15 to 2.70.

Item 69: The transparent laminate according to Item 67 or 68,
wherein the hollow particles have an average particle diameter of 20 to 100 nm.

Item 70: The transparent laminate according to any one of Items 65 to 69,
wherein the antireflection layer contains a second solvent having a boiling point that is higher than the boiling point of water and not higher than temperatures to which the substrate is resistant.

Item 71: The transparent laminate according to Item 70,
wherein the second solvent contains 3-methoxy-3methyl-1-butanol as a main component.

Item 72: The transparent laminate according to Item 70 or 71,
wherein the first functional layer contains the second solvent at a concentration of 1 ppb or more and 5 g/cm$^3$% or less.

Item 73: The transparent laminate according to any one of Items 2 to 72,
wherein the substrate is glass.

Item 74: The transparent laminate according to any one of Items 2 to 73,
wherein the substrate is float glass produced using a float process, and the concentration of tin oxide in the first main surface is lower than the concentration of tin oxide in the second main surface.

Item 75: The transparent laminate according to any one of Items 2 to 73,
wherein the substrate is float glass produced using a float process, and the concentration of tin oxide in the first main surface is higher than the concentration of tin oxide in the second main surface.

Item 76: The transparent laminate according to any one of Items 1 to 75, further including:
a third functional layer that is layered on the second main surface of the substrate.

Item 77: A wirelessly controlled flying object including:
an image capturing apparatus that includes a lens; and
a cover member that is formed from the transparent laminate according to any one of Items 1 to 76 and covers the lens,
wherein the cover member is arranged such that the antifog layer faces the lens.

Item 78: The flying object according to Item 77, configured to be able to travel under water.

Item 79: A cover member configured to be provided in a wirelessly controlled flying object on which an image capturing apparatus including a lens is mounted,
wherein the cover member is formed from the transparent laminate according to any one of Items 1 to 76, and
the cover member is arranged such that the antifog layer faces the lens.

Item 80: A manned or unmanned movable body including:
an image capturing apparatus that includes a lens; and
a cover member that is formed from the transparent laminate according to any one of Items 1 to 76 and covers the lens,
wherein the cover member is arranged such that the antifog layer faces the lens,
a control method of the movable body is selected from wireless control, autonomous control, direct manual control, and a combination of any of these, and
the movable body is at least any one of a flying object and movable bodies that travel on the ground, above water, or under water, excluding conventional automobiles, airplanes, helicopters, ships, and submarines.

Advantageous Effects of Invention

According to the present invention, a transparent functional layer is layered on a surface of the substrate. Accordingly, by imparting functions to the functional layer, it is possible to make the transparent laminate usable for applications other than protecting an article.

DESCRIPTION OF EMBODIMENTS

A. First Embodiment

Figure 1:
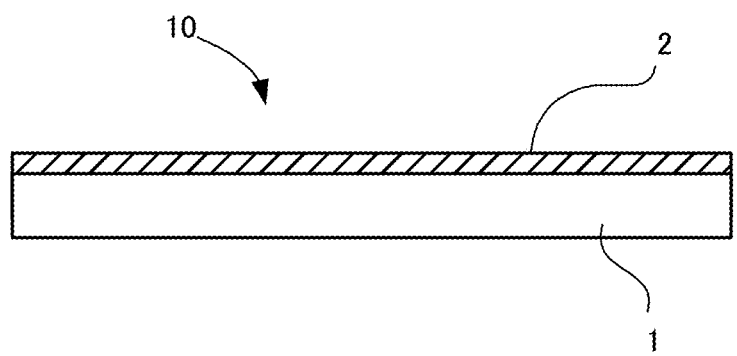
FIG. 1 is a cross-sectional view showing a first embodiment of a cover member according to the present invention.

The following describes a first embodiment of a case in which a transparent laminate according to the present invention is applied to a cover member, with reference to the drawings. FIG. 1 is a cross-sectional view of the cover member.

1. Outline of Cover Member

A cover member according to the present embodiment is arranged in front of a lens of an image capturing apparatus such as a camera, for example, to protect the lens and the like. Specifically, as shown in FIG. 1, the cover member 10 includes a transparent substrate 1 that has a first main surface 11 and a second main surface 12 and a first functional layer 2 that is layered on the first main surface 11 of the substrate 1. The following describes each member in detail.

2. Substrate

The substrate 1 can be formed from a resin material (organic polymer material) that allows the passage of light or a glass plate. The shape of the substrate is not particularly limited and can be determined as appropriate according to various uses which will be described later. For example, the substrate can have a circular shape, a rectangular shape, a polygonal shape, or any other shape. The following describes the substrate using specific examples.

2-1. Resin Material

The resin material is not particularly limited as long as the resin material allows the passage of light as described above. For example, the substrate can be formed from polycarbonate (PC), acrylonitrile-styrene resin (AS), acrylonitrile-butadiene-styrene resin (ABS), methacrylic resin (PMMA), vinyl chloride (PVC), triacetylcellulose (TAC), or a material containing a plurality of these.

2-2. Glass Plate

The glass plate 1 is not particularly limited, and a known transparent glass plate can be used. For example, various glass plates such as a float glass plate, a heat-ray absorbing glass plate, a clear glass plate, a green glass plate, a UV green glass plate, and a soda lime glass plate can be used.

The following shows example compositions of clear glass, heat-ray absorbing glass, soda lime-based glass, and float glass.

2-2-1. Clear Glass $SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide (T-$Fe_2O_3$) in terms of $Fe_2O_3$: 0.08 to 0.14 mass %

2-2-2. Heat-Ray Absorbing Glass

With regard to the composition of heat-ray absorbing glass, a composition, which is based on the composition of clear glass, obtained by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of the glass by an amount corresponding to the increases in T-$Fe_2O_3$, $CeO_2$, and $TiO_2$ can be used, for example.

2-2-3. Soda Lime-Based Glass $SiO_2$: 65 to 80 mass %
$Al_2O_3$: 0 to 5 mass %
CaO: 5 to 15 mass %
MgO: at least 2 mass %
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) in terms of $Fe_2O_3$: 0.02 to 0.03 mass %

2-2-4. Float Glass
 SiO$_2$: 65% to 80%
 Al$_2$O$_3$: 0% to 5%
 MgO: 0% to 20%
 CaO: 0% to 20%
 Na$_2$O: 10% to 20%
 K$_2$O: 0% to 5%
2-2-4-1. Float Glass with High Transmittance
 SiO$_2$: 66% to 72%
 Al$_2$O$_3$: 2% to 4%
 MgO: 8% to 15%
 CaO: 1% to 8%
 Na$_2$O: 12% to 16%
 K$_2$O: 0% to 1%
 MgO+CaO: 12% to 17%
 Molar ratio CaO/(MgO+CaO): 0.1 to 0.4

The following describes components included in the composition of the float glass.

SiO$_2$

SiO$_2$ is a main component constituting the glass plate 1. An excessively low SiO$_2$ content results in a decrease in chemical durability, such as water resistance, and heat resistance of glass. On the other hand, an excessively high SiO$_2$ content results in an increase in the viscosity of the glass plate 1 at high temperatures, making it difficult to melt and form the glass plate 1. Therefore, an appropriate range of the SiO$_2$ content is 66 to 72 mol %, and preferably 67 to 70 mol %.

Al$_2$O$_3$

Al$_2$O$_3$ is a component for improving chemical durability, such as water resistance, of the glass plate 1 and furthermore facilitating the movement of alkali metal ions in the glass, thereby increasing the surface compressive stress after chemical strengthening and increasing the depth of a stress layer. On the other hand, an excessively high Al$_2$O$_3$ content results in an increase in the viscosity of the glass melt, thereby increasing T$_2$ and T$_4$ and degrading the clarity of the glass melt, and consequently, making it difficult to produce a high-quality glass plate. In a float process, working temperature is the temperature at which the viscosity of glass is 10$^4$ dPa·s and hereinafter will be referred to as T$_4$. Also, melting temperature is the temperature at which the viscosity of glass is 10$^2$ dPa·s and hereinafter will be referred to as T$_2$.

Therefore, an appropriate range of the Al$_2$O$_3$ content is 1 to 4 mol %. The Al$_2$O$_3$ content is preferably 3 mol % or less and preferably 2 mol % or more.

MgO

MgO is an essential component that improves the meltability of glass. In order to sufficiently achieve this effect, the MgO content in the glass plate 1 is 8 mol % or more. Furthermore, if the MgO content is less than 8 mol %, the surface compressive stress after chemical strengthening decreases, and the depth of the stress layer is thus likely to be small. On the other hand, if the MgO content is increased to more than a suitable amount, strengthening performance that is obtained through chemical strengthening is degraded; in particular, the depth of the surface compressive stress layer is drastically reduced. Although this adverse effect of MgO is the smallest compared with those of all the other alkaline earth metal oxides, the MgO content in this glass plate 1 is 15 mol % or less. Furthermore, a high MgO content increases T$_2$ and T$_4$ and degrades the clarity of the glass melt, thereby making it difficult to produce a high-quality glass plate.

Therefore, the MgO content in this glass plate 1 is within a range of 8 to 15 mol %, and preferably 12 mol % or less.

CaO

CaO has the effect of reducing viscosity at high temperatures; however, an extremely high CaO content that exceeds a suitable range is likely to devitrify the glass plate 1 and inhibit the movement of sodium ions in the glass plate 1. In the case where no CaO is contained, the surface compressive stress after chemical strengthening is likely to decrease. On the other hand, if CaO is contained in an amount of more than 8 mol %, the surface compressive stress after chemical strengthening markedly decreases, the depth of the compressive stress layer markedly decreases, and the glass plate 1 is likely to be devitrified.

Therefore, an appropriate range of the CaO content is 1 to 8 mol %. The CaO content is preferably 7 mol % or less and preferably 3 mol % or more.

SrO, BaO

SrO and BaO significantly reduce the viscosity of the glass plate 1, and when contained in a small amount, SrO and BaO more markedly have the effect of reducing the liquid phase temperature TL than CaO. However, even when added in a very small amount, SrO and BaO markedly hinder the movement of sodium ions in the glass plate 1, significantly reduce the surface compressive stress, and considerably reduce the depth of the compressive stress layer.

Therefore, it is preferable that this glass plate 1 substantially does not contain SrO and BaO.

RO

In the present embodiment, RO represents the sum of MgO and CaO. When the RO content is excessively low, components that reduce the viscosity of the glass plate 1 are insufficient and the glass plate 1 is difficult to melt. On the other hand, an excessively high RO content significantly reduces the surface compressive stress, considerably reduces the depth of the compressive stress layer, and is likely to sharply increase the liquid phase temperature TL.

Therefore, an appropriate range of the RO content is 12 to 17 mol %. The RO content is preferably 14 mol % or more and 16 mol % or less.

The liquid phase temperature tends to be low particularly when the molar ratio CaO/RO of the CaO content to the RO content is within the range of 0.1 to 0.4. Therefore, an appropriate range of the molar ratio is 0.1 to 0.4. Furthermore, when the molar ratio is reduced, the surface compressive stress and the depth of the compressive stress layer can be improved, but T$_2$ and T$_4$ become high, the composition significantly deviates from SL in the narrow sense, and it becomes difficult to produce a glass article. Therefore, the molar ratio is preferably 0.2 or more and 0.3 or less.

Na$_2$O

Na$_2$O is a component for increasing the surface compressive stress and increasing the depth of the surface compressive stress layer, due to sodium ions being replaced with potassium ions. However, if the Na$_2$O content is increased to more than a suitable amount, stress relaxation during chemical strengthening treatment surpasses generation of the surface compressive stress due to ion exchange during chemical strengthening treatment, and as a result, the surface compressive stress is likely to decrease.

Also, while Na$_2$O is a component for improving meltability and reducing T$_4$ and T$_2$, an excessively high Na$_2$O content results in a significant decrease in the water resistance of the glass. If the Na$_2$O content in the glass plate 1 is 12 mol % or more, a sufficient effect of reducing T$_4$ and T$_2$ can be obtained, and if the Na$_2$O content is more than 16 mol %, the surface compressive stress markedly decreases due to the stress relaxation.

Therefore, an appropriate range of the $Na_2O$ content in the glass plate 1 of the present embodiment is 12 to 16 mol %. The $Na_2O$ content is preferably 13 mol % or more, and more preferably 15 mol % or less.

$K_2O$ $K_2O$, like $Na_2O$, is a component that improves the meltability of glass. Also, in a low $K_2O$ content range, the ion exchange rate during chemical strengthening increases, and the depth of the surface compressive stress layer thus increases, while, on the other hand, the liquid phase temperature TL of the glass plate 1 decreases. Therefore, it is preferable that $K_2O$ is contained in a small amount.

On the other hand, although the effect of reducing $T_4$ and $T_2$ of $K_2O$ is smaller than that of $Na_2O$, a high $K_2O$ content inhibits clarification of the glass melt. Furthermore, the higher the $K_2O$ content, the lower the surface compressive stress after the chemical strengthening. Therefore, an appropriate range of the $K_2O$ content is 0 to 1 mol %.

$Li_2O$ $Li_2O$, when contained even in a small amount, significantly reduces the depth of the compressive stress layer. Also, in the case where a glass article containing $Li_2O$ is chemically strengthened in a molten salt of potassium nitrate alone, the molten salt deteriorates significantly faster than in the case of a glass article that does not contain $Li_2O$. Specifically, in the case where the glass articles are repeatedly chemically strengthened using the same molten salt, surface compressive stress generated in the glass surface of the glass article containing $Li_2O$ decreases in the fewer cycles. Therefore, although the glass plate 1 of the present embodiment may contain $Li_2O$ in an amount of 1 mol % or less, it is preferred that the glass plate 1 substantially does not contain $Li_2O$.

$B_2O_3$ $B_2O_3$ is a component that lowers the viscosity of the glass plate 1 and improves meltability. However, if the $B_2O_3$ content is excessively high, phase separation is likely to occur in the glass plate 1, resulting in a decrease in the water resistance of the glass plate 1. Also, a compound formed of $B_2O_3$ and an alkali metal oxide may volatilize and cause damage to a refractory material of a glass melting chamber. Furthermore, if $B_2O_3$ is contained, the depth of the compressive stress layer formed by chemical strengthening becomes smaller. Therefore, an appropriate $B_2O_3$ content is 0.5 mol % or less. In the present invention, it is more preferable that the glass plate 1 substantially does not contain $B_2O_3$.

$Fe_2O_3$

Usually, Fe is present as $Fe^{2+}$ or $Fe^{3+}$ in glass, and functions as a colorant. $Fe^{3+}$ is a component that improves the ultraviolet absorption performance of glass, and $Fe^{2+}$ is a component that improves heat absorption performance. In the case where the glass plate 1 is to be used as a cover glass for a display, its coloration is required to be inconspicuous, and therefore, a lower Fe content is preferred. However, Fe from industrial raw materials is often inevitably mixed in glass. Therefore, the content of iron oxide in terms of $Fe_2O_3$ is preferably 0.15 mass % or less, more preferably 0.1 mass % or less, and even more preferably 0.02 mass % or less, where the glass plate 1 as a whole is taken as 100 mass %. In particular, the Fe content is small in the float glass with high transmittance described above, and therefore, a high transmittance can be realized. For example, when the thickness of the glass is 0.55 mm, a transmittance of 91% or more and 100% or less can be realized with respect to light having a wavelength of 550 nm.

$TiO_2$ $TiO_2$ is a component that reduces the viscosity of the glass plate 1 and also increases the surface compressive stress generated by chemical strengthening, but $TiO_2$ may add a yellow color to the glass plate 1. Therefore, an appropriate $TiO_2$ content is 0 to 0.2 mass %. Furthermore, $TiO_2$ from commonly used industrial raw materials is inevitably mixed in the glass plate 1 and thus may be contained therein in an amount of approximately 0.05 mass %. With a content like this, $TiO_2$ does not add any color to glass and may be contained in the glass plate 1 of the present embodiment.

$ZrO_2$

Especially when producing a glass plate using the float process, $ZrO_2$ may be mixed in the glass plate 1 from refractory bricks constituting a glass melting furnace, and the $ZrO_2$ content in that case is known to be approximately 0.01 mass %. On the other hand, $ZrO_2$ is a component that improves the water resistance of glass and increases the surface compressive stress generated by chemical strengthening. However, a high $ZrO_2$ content may cause an increase in working temperature $T_4$ and a sharp increase in liquid phase temperature TL and, in the production of a glass plate using the float process, makes it likely that crystals containing precipitated Zr remain in the produced glass as foreign matter. Therefore, an appropriate $ZrO_2$ content is 0 to 0.1 mass %.

$SO_3$

In the float process, a sulfate such as sodium sulfate ($Na_2SO_4$) is widely used as a clarifying agent. The sulfate decomposes in the molten glass and generates a gas component, and thus, degassing of the glass melt is promoted, but a portion of the gas component dissolves and remains in the glass plate 1 as $SO_3$. It is preferable that the $SO_3$ content in the glass plate 1 of the present invention is 0 to 0.3 mass %.

$CeO_2$ $CeO_2$ is used as a clarifying agent. $CeO_2$ produces $O_2$ gas in the molten glass, and therefore, $CeO_2$ contributes to degassing. On the other hand, an excessively high $CeO_2$ content causes the glass to be discolored to yellow. Therefore, the $CeO_2$ content is preferably 0 to 0.5 mass %, more preferably 0 to 0.3 mass %, and even more preferably 0 to 0.1 mass %.

$SnO_2$

It is known that, in a glass plate that is formed using the float process, tin from a tin bath has diffused into a surface that has been in contact with the tin bath during the formation of the glass plate, and the diffused tin is present as $SnO_2$. Also, $SnO_2$ mixed with glass raw materials contributes to degassing. The $SnO_2$ content in the glass plate 1 of the present invention is preferably 0 to 0.3 mass %.

Other Components

It is preferable that the glass plate 1 according to the present embodiment is substantially composed of the above-listed components. However, the glass plate 1 according to the present embodiment may also contain components other than the above-listed components as long as the content of each such component is preferably less than 0.1 mass %.

Examples of the components that can be contained include $As_2O_3$, $Sb_2O_5$, Cl, and F that may be added for the purpose of degassing the molten glass in addition to $SO_3$ and $SnO_2$ described above. However, it is preferable that $As_2O_3$, $Sb_2O_3$, Cl, and F are not added because of their significant adverse effects on the environment and for other reasons. Other examples of the components that can be contained are ZnO, $P_2O_3$, $GeO_2$, $Ga_2O_3$, $Y_2O_3$, and $La_2O_3$. Components that are derived from industrially used raw materials other than those described above can also be contained as long as the content of each such component does not exceed 0.1 mass %. Since these components may be appropriately added as necessary, or inevitably mixed in, it is possible that the glass plate 1 of the present embodiment substantially does not contain these components.

Density (Specific Gravity): d

With the above-described composition, the density of the glass plate 1 according to the present embodiment can be reduced to 2.53 g·cm$^{-3}$ or less, or 2.51 g·cm$^{-3}$ or less, or even to 2.50 g·cm$^{-3}$ or less in certain cases.

In the float process or the like, if there is a significant difference in density between product types of glass, the molten glass having the higher density may stagnate in a bottom portion of the melting furnace when changing the product type of glass that is produced, and therefore, the product type cannot be changed smoothly. The density of soda-lime glass that is currently mass-produced using the float process is approximately 2.50 g·cm$^{-3}$. For this reason, in the context of mass production using the float process, it is preferable that the density of the glass plate 1 is close to the aforementioned values, or specifically is 2.45 to 2.55 g·cm$^{-3}$, more preferably 2.47 to 2.53 g·cm$^{-3}$, and even more preferably 2.47 to 2.50 g·cm$^{-3}$.

Elasticity: E

A glass substrate may be warped when subjected to chemical strengthening that involves ion exchange. In order to prevent the warpage, it is preferable that the glass plate 1 has a high elasticity. According to the present invention, the elasticity (Young's modulus: E) of the glass plate 1 can be increased to 70 GPa or more, or even to 72 GPa or more.

Coefficient of Thermal Expansion

For example, a coefficient of thermal expansion that is no greater than $50 \times 10^{-7}$ to $100 \times 10^{-7}$/K % in the range from 50° C. to 350° C. can be realized for the float glass with high transmittance described above.

2-2-5. Orientation of Glass Plate

In a glass plate produced using the float process, a surface that was in contact with a molten metal will be referred to as a "bottom surface" and the opposite surface will be referred to as a "top surface". The bottom surface and the top surface may be unpolished surfaces. In the case where the molten metal was tin, the concentration of tin oxide contained in the bottom surface is higher than the concentration of tin oxide contained in the top surface because the bottom surface was in contact with the molten metal.

As described above, the concentration of tin oxide in the bottom surface is high, and therefore, the bottom surface has an effect of suppressing elution of alkaline components contained in the glass plate. In order to suppress a reduction in durability due to elution of alkaline components, the first functional layer 2 described above can be layered on the bottom surface. On the other hand, the concentration of tin oxide in the top surface is low, and accordingly, the concentration of SiOH groups present at the surface is relatively high. Accordingly, when it is desired to increase adhesiveness using chemical bonds between OH groups in the first functional layer 2 and SiOH groups present at the surface, the first functional layer 2 can be layered on the top surface. Also, in order to avoid the influence of a trace amount of metal (tin), it is possible to polish the bottom surface using a polishing agent such as cerium oxide and layer the first functional layer 2 on the bottom surface, the top surface, or both of the bottom surface and the top surface. The above applies not only to the first functional layer 2 but also to other functional layers described in the present specification.

2-2-6. Thickness of Glass Plate

The thickness of the glass plate 1 is not particularly limited, but is preferably 0.2 mm or more and 10 mm or less, for example, and more preferably 0.5 mm or more and 4 mm or less. When the thickness of the glass plate 1 is less than 0.2 mm, the stiffness may decrease, and when the thickness of the glass plate 1 is more than 10 mm, the weight may increase. When the substrate 1 is formed from a resin material as described above, the substrate 1 can have a thickness similar to the thickness of the glass plate.

3. First Functional Layer

The first functional layer 2 can be constituted by films having various functions. For example, a heat insulation film (heat reflection film) and an antifog layer (or an antifog sheet) can be used. The heat insulation film is a known film configured to reflect or absorb infrared rays to suppress an increase in the temperature of the image capturing apparatus. Such a film can be attached to the first main surface 11 of the substrate 1 using an adhesive material, or a film that has a heat insulation function can be formed on the first main surface 11 through coating. The following describes an antifog layer, which is another example of the first functional layer 2, in detail 3-1. Antifog Layer There is no particular limitation on the antifog layer as long as it has an effect of preventing the substrate 1 from fogging, and a known antifog layer can be used. In general, types of antifog layers include a hydrophilic type that turns water generated from water vapor into a water layer on its surface, a water absorbent type that absorbs water vapor, a water repellent absorbent type that suppresses condensation of water vapor into waterdrops on its surface, and a water repellent type that repels waterdrops produced by water vapor. All these types can be used as the antifog layer. The following describes a water repellent absorbent type antifog layer as an example.

Organic-Inorganic Composite Antifog Layer

An organic-inorganic composite antifog layer is a single layer film formed on the surface of a functional layer, or a multilayer film layered on the functional layer. The organic-inorganic composite antifog layer contains at least a water absorbent resin, a water repellent group, and a metal oxide component. The antifog layer may further contain other functional components as needed. There is no limitation on the type of the water absorbent resin as long as the water absorbent resin can absorb and retain water. The water repellent group can be supplied to the antifog layer from a metallic compound that has the water repellent group (water repellent group-containing metallic compound). The metal oxide component can be supplied to the antifog layer from the water repellent group-containing metallic compound, any other metallic compound, metal oxide microparticles, or the like. The following describes each component.

Water Absorbent Resin

The water absorbent resin is not particularly limited, and examples thereof include polyethylene glycol, polyether resin, polyurethane resin, starch resin, cellulose resin, acrylic resin, epoxy resin, polyester polyol, hydroxyalkyl cellulose, polyvinyl alcohol, polyvinylpyrrolidone, polyvinyl acetal resin, and polyvinyl acetate. Out of these, hydroxyalkyl cellulose, polyvinyl alcohol, polyvinylpyrrolidone, polyvinyl acetal resin, polyvinyl acetate, epoxy resin, and polyurethane resin are preferable. Polyvinyl acetal resin, epoxy resin, and polyurethane resin are more preferable. Polyvinyl acetal resin is particularly preferable.

Polyvinyl acetal resin can be obtained by causing acetalization through a condensation reaction between polyvinyl alcohol and an aldehyde. Acetalization of polyvinyl alcohol can be carried out using a known method such as a precipitation method in which an aqueous medium is used in the presence of an acid catalyst or a dissolution method in which a solvent such as alcohol is used. Acetalization can also be carried out in parallel with saponification of polyvinyl acetate. The degree of acetalization is preferably 2 to 40 mol %, more preferably 3 to 30 mol %, particularly preferably 5 to 20 mol %, and optionally 5 to 15 mol %. The degree of acetalization can be measured based on $^{13}C$ nuclear magnetic resonance spectroscopy, for example. Polyvinyl acetal resin of which the degree of acetalization is within the above-described range is suitable to form an organic-inorganic composite antifog layer that has good water absorbency and good water resistance.

The average polymerization degree of polyvinyl alcohol is preferably 200 to 4500, and more preferably 500 to 4500. A high average polymerization degree is advantageous in forming an organic-inorganic composite antifog layer that has good water absorbency and good water resistance, but if the average polymerization degree is too high, the viscosity of a solution becomes too high and a problem may occur in the formation of a film. The degree of saponification of polyvinyl alcohol is preferably 75 to 99.8 mol %.

Examples of the aldehyde to be condensed with polyvinyl alcohol include aliphatic aldehydes such as formaldehyde, acetaldehyde, butyraldehyde, hexyl carbaldehyde, octyl carbaldehyde, and decyl carbaldehyde. Examples of the aldehyde also include aromatic aldehydes such as: benzaldehyde; 2-methylbenzaldehyde, 3-methylbenzaldehyde, 4-methylbenzaldehyde, other alkyl group-substituted benzaldehyde; chlorobenzaldehyde, other halogen atom-substituted benzaldehyde; substituted benzaldehyde in which a hydrogen atom is substituted with a functional group other than alkyl groups, such as a hydroxy group, an alkoxy group, an amino group, or a cyano group; and condensed aromatic ring aldehydes such as naphthaldehyde and anthraldehyde. Aromatic aldehydes with strong hydrophobicity are advantageous in forming an organic-inorganic composite antifog layer that has a low degree of acetalization and excellent water resistance. The use of aromatic aldehydes is also advantageous in forming a film that has a high degree of water absorbency while leaving many hydroxyl groups. Polyvinyl acetal resin preferably includes an acetal structure that derives from an aromatic aldehyde, or particularly benzaldehyde.

Examples of epoxy resins include glycidyl ether-based epoxy resin, glycidyl ester-based epoxy resin, glycidyl amine-based epoxy resin, and cyclic aliphatic epoxy resin. Out of these, cyclic aliphatic epoxy resin is preferable.

Examples of polyurethane resins include a polyurethane resin composed of a polyisocyanate and a polyol. As the polyol, acrylic polyols and polyoxyalkylene-based polyols are preferable.

Surface-modified TAC (triacetylcellulose) may be used as cellulose resin. Examples of modification methods include physical modification methods and chemical modification methods. Examples of physical modification methods include an actinic ray irradiation method, a plasma treatment method, and a corona discharge method. As a chemical modification method, acyl groups in the TAC structure may be changed to hydroxyl groups to hydrophilize the surface (see JP 2017-57370A and JP 2017-57242A, for example). Specifically, it is possible to change acyl groups in the TAC structure to hydroxyl groups by making TAC swell with alcohol, causing saponification using a KOH aqueous solution, and performing heat treatment and neutralization washing. Through the saponification treatment, it is possible to obtain surface-modified TAC including TAC with a thickness of 10 to 200 µm and a modified TAC layer with a thickness of 1 to 6 µm. The modified TAC layer functions as an antifog layer. An antireflection layer according to the present invention may also be formed on the modified TAC layer (antifog layer). The thickness of TAC may be evaluated based on Japanese Industrial Standards (JIS K7130: 1999 Plastics-Film and sheeting-Determination of thickness). In the case where the modified layer is a saponified layer obtained through saponification, the thickness of the saponified layer may be determined as follows. A sample obtained from the antifog film is immersed in dichloromethane in 24 hours. A portion of the sample that does not dissolve and remains after being immersed is dried, and the thickness of the dried sample is measured three times. The average value of the three measured values is taken to be the thickness of the saponified layer (see [0039] in JP 2017-57370A, for example).

The organic-inorganic composite antifog layer contains the water absorbent resin as the main component. In the present invention, the "main component" refers to the component whose content is the highest on the mass basis. From the viewpoint of hardness of the film, water absorbency, and the antifog property, the content of the water absorbent resin based on the weight of the organic-inorganic composite antifog layer is preferably 50 mass % or more, more preferably 60 mass % or more, and particularly preferably 65 mass % or more, and preferably 95 mass % or less, and more preferably 90 mass % or less.

Water Repellent Group

In order to sufficiently achieve the above-described effect of the water repellent group, it is preferable to use a water repellent group that has high water repellency. Preferably, the water repellent group is at least one type of water repellent group selected from (1) chain or cyclic alkyl groups having 3 to 30 carbon atoms and (2) chain or cyclic alkyl groups having 1 to 30 carbon atoms in which at least some hydrogen atoms are substituted with fluorine atoms (also referred to as "fluorine-substituted alkyl groups" hereinafter).

The chain or cyclic alkyl groups in (1) and (2) are preferably chain alkyl groups. The chain alkyl groups may be branched alkyl groups, but are preferably linear alkyl groups. Alkyl groups having more than 30 carbon atoms may make the antifog layer opaque. The number of carbon atoms in the alkyl groups is preferably 20 or less, and more preferably 6 to 14 from the viewpoint of the balance between the antifog property, strength, and external appearance of the film. Particularly preferable alkyl groups are linear alkyl groups having 6 to 14 carbon atoms, or particularly 6 to 12 carbon atoms, such as an n-hexyl group (having 6 carbon atoms), an n-decyl group (having 10 carbon atoms), and an n-dodecyl group (having 12 carbon atoms). The fluorine-substituted alkyl groups in (2) may be groups obtained by substituting only some hydrogen atoms of a chain or cyclic alkyl group with fluorine atoms, or groups obtained by substituting all hydrogen atoms of a chain or cyclic alkyl group with fluorine atoms, such as linear perfluoroalkyl groups. The fluorine-substituted alkyl groups have high water repellency, and therefore, it is possible to sufficiently achieve the effect by adding a small amount thereof. However, when the content of the fluorine-substituted alkyl groups is excessively large, a component having the fluorine-substituted alkyl groups may separate from the other components in a coating solution for forming the film.

Hydrolyzable Metallic Compound Having Water Repellent Group

In order to blend the water repellent group into the antifog layer, a metallic compound having the water repellent group (water repellent group-containing metallic compound), particularly a metallic compound having the water repellent group and a hydrolyzable functional group or a halogen atom (water repellent group-containing hydrolyzable metallic compound), or a hydrolysate thereof is added to a coating solution for forming the film. In other words, the water repellent group may be derived from a water repellent group-containing hydrolyzable metallic compound. A water repellent group-containing hydrolyzable silicon compound represented by Formula (I) shown below is preferably used as the water repellent group-containing hydrolyzable metallic compound.

$$R_mSiY_{4-m} \quad (I)$$

Here, R represents a water repellent group, that is, a chain or cyclic alkyl group having 1 to 30 carbon atoms in which at least some of hydrogen atoms are optionally substituted with fluorine atoms, Y represents a hydrolyzable functional group or a halogen atom, and m represents an integer of 1 to 3. The hydrolyzable functional group is at least one type selected from an alkoxyl group, an acetoxy group, an alkenyloxy group, and an amino group, and preferably an alkoxy group, particularly an alkoxy group having 1 to 4 carbon atoms. An example of the alkenyloxy group is an isopropenoxy group. The halogen atom is preferably a chlorine atom. It should be noted that the functional groups mentioned here as examples can also be used as "hydrolyzable functional groups" described hereinafter. m is preferably 1 or 2.

When the progress of hydrolysis and polycondensation is completed, the compound represented by Formula (I) supplies a component represented by Formula (II) below.

$$R_mSiO_{(4-m)/2} \quad (II)$$

Here, R and m are as described above. In practice, after the hydrolysis and polycondensation, the compound represented by Formula (II) forms a network structure in which silicon atoms are linked to one another via oxygen atoms in the antifog layer.

As described above, the compound represented by Formula (I) is hydrolyzed or partially hydrolyzed, and at least portions thereof are polycondensed. Thus, a network structure including siloxane bonds (Si—O—Si) is formed in which silicon atoms and oxygen atoms are alternately linked and that spreads three-dimensionally. The water repellent group R is linked to the silicon atom contained in this network structure. In other words, the water repellent group R is immobilized in the network structure including siloxane bonds via an R—Si bond. This structure is advantageous in uniformly dispersing the water repellent groups R in the film. The network structure may contain silica components supplied from silicon compounds (e.g., tetraalkoxysilane and silane coupling agents) other than the water repellent group-containing hydrolyzable silicon compound represented by Formula (I). If a silicon compound that does not have any water repellent group and has a hydrolyzable functional group or a halogen atom (water repellent group-free hydrolyzable silicon compound) is blended together with the water repellent group-containing hydrolyzable silicon compound into a coating solution for forming the antifog layer, a network structure including siloxane bonds containing silicon atoms that are linked to water repellent groups and silicon atoms that are not linked to water repellent groups can be formed. With such a structure, it is easy to independently adjust the content of the water repellent group and the content of the metal oxide component in the antifog layer.

The water repellent group has an effect of enhancing the antifog performance by enhancing water vapor permeability of the surface of the antifog layer containing the water absorbent resin. The two functions, namely the water absorbent function and the water repellent function, are contrary to each other, and therefore, a water absorbent material and a water repellent material are conventionally distributed in separate layers. However, the water repellent group resolves the maldistribution of water near the surface of the antifog layer, so that the time it takes until dew condenses is prolonged, and the antifog property of the antifog layer having a single layer structure is thus enhanced. The following is a description of the effects.

Water vapor that has infiltrated the antifog layer containing the water absorbent resin forms hydrogen bonds with hydroxy groups in the water absorbent resin and the like, and is retained in the form of bound water. As the amount of water vapor increases, the form of water vapor changes from bound water to semibound water, and finally, water vapor is retained in the form of free water retained in voids in the antifog layer. The water repellent group prevents the formation of hydrogen bonds and facilitates the dissociation of formed hydrogen bonds in the antifog layer. If the content of the water absorbent resin is the same, the number of hydroxy groups capable of forming a hydrogen bond in the layer is the same, but the speed of hydrogen bond formation is reduced due to the water repellent group. Therefore, if the antifog layer containing the water repellent group is used, moisture will ultimately be retained in any of the above-described forms in the antifog layer, but water vapor can diffuse to the bottom portion of the layer as is until it is retained therein. Moreover, water that is once retained dissociates relatively easily and is likely to move to the bottom portion of the layer in the form of water vapor. As a result, the distribution of the retention amount of moisture in the thickness direction of the layer is relatively uniform between the vicinity of the surface and the bottom portion of the layer. That is, the entirety of the antifog layer in the thickness direction can be effectively used to absorb water supplied to the surface of the antifog layer, and therefore, waterdrops are less likely to be formed on the surface through condensation, thus resulting in enhancement of the antifog property. Furthermore, the antifog layer that has absorbed moisture is less likely to freeze even at low temperatures because waterdrops are less likely to be formed on the surface through condensation.

On the other hand, in an antifog layer that does not contain water repellent groups, water vapor that has infiltrated the antifog layer is retained significantly easily in the form of bound water, semibound water, or free water. Therefore, water vapor that has infiltrated the antifog layer tends to be retained in the vicinity of the surface of the antifog layer. As a result, in the antifog layer, the amount of moisture is extremely large in the vicinity of the surface, and sharply decreases toward the bottom portion of the antifog layer. That is, although the bottom portion of the antifog layer can further absorb water, moisture saturates in the vicinity of the surface of the antifog layer and condenses into waterdrops, and therefore, the antifog property is limited.

When the water repellent group is introduced into the antifog layer using the water repellent group-containing hydrolyzable silicon compound (see Formula (I)), a network structure including stable siloxane bonds (Si—O—Si) is formed. The formation of this network structure is advantageous from the viewpoint that not only abrasion resistance but also hardness, water resistance, and the like are enhanced.

It is sufficient that the water repellent group is added in an amount at which the contact angle of water on the surface of the antifog layer is 70° or more, preferably 80° or more, and even more preferably 90° or more. A measurement value obtained by dropping a 4 mg drop of water onto the surface of the antifog layer is taken as the contact angle of water. In particular, when a methyl group or ethyl group, which has slightly low water repellency, is used as the water repellent group, it is preferable to blend, into the antifog layer, the water repellent group in an amount at which the contact angle of water is within the above-described range. The upper limit of the contact angle of water is not particularly limited, but is 150° or less, 120° or less, or 100° or less, for example. It is preferable that the water repellent group is uniformly contained in the antifog layer so that the contact angle of water is within the above-described range over the entire region of the surface of the antifog layer.

It should be noted that the surface of the antifog layer can also be made water repellent. In this case, infiltration of alkaline components into the antifog layer can be suppressed to protect the surface of the glass plate 1 from the alkaline components.

It is preferable that the antifog layer contains the water repellent group in an amount that is within a range of 0.05 parts by mass or more, preferably 0.1 parts by mass or more, and more preferably 0.3 parts by mass or more, and 10 parts by mass or less, and preferably 5 parts by mass or less, with respect to 100 parts by mass of the water absorbent resin.

Inorganic Oxide

As an inorganic oxide, an oxide of at least one element selected from Si, Ti, Zr, Ta, Nb, Nd, La, Ce, and Sn is contained, for example, and at least an oxide of Si (silica) is contained. The organic-inorganic composite antifog layer preferably contains the inorganic oxide in an amount of 0.01 parts by weight or more, more preferably 0.1 parts by weight or more, further preferably 0.2 parts by weight or more, particularly preferably 1 part by weight or more, most preferably 5 parts by weight or more, optionally 10 parts by weight or more, and 20 parts by weight or more if necessary, and preferably 50 parts by weight or less, more preferably 45 parts by weight or less, further preferably 40 parts by weight or less, particularly preferably 35 parts by weight or less, most preferably 33 parts by weight or less, and optionally 30 parts by weight or less, with respect to 100 parts by weight of the water absorbent resin. The inorganic oxide is a component that is necessary to ensure the strength, particularly abrasion resistance of the organic-inorganic composite antifog layer, but if the content of the inorganic oxide is large, the antifog property of the organic-inorganic composite antifog layer is impaired.

Inorganic Oxide Microparticles

The organic-inorganic composite antifog layer may further contain inorganic oxide microparticles as at least a portion of the inorganic oxide. The inorganic oxide that constitutes the inorganic oxide microparticles is an oxide of at least one element selected from Si, Ti, Zr, Ta, Nb, Nd, La, Ce, and Sn, for example, and microparticles of silica are preferable. Microparticles of silica can be introduced into the organic-inorganic composite antifog layer by adding colloidal silica thereto, for example. Inorganic oxide microparticles excel at transmitting stress applied to the organic-inorganic composite antifog layer to an article that supports the organic-inorganic composite antifog layer, and also have a high hardness. Therefore, the addition of inorganic oxide microparticles is advantageous from the viewpoint of enhancing the abrasion resistance of the organic-inorganic composite antifog layer. Moreover, when inorganic oxide microparticles are added to the organic-inorganic composite antifog layer, minute voids are formed in portions where the microparticles are in contact with one another or close to one another, and water vapor is likely to be trapped in the antifog layer through these voids. Accordingly, the addition of inorganic oxide microparticles may advantageously act to enhance the antifog property. It is possible to supply inorganic oxide microparticles to the organic-inorganic composite antifog layer by adding inorganic oxide microparticles that are formed in advance to a coating solution for forming the organic-inorganic composite antifog layer.

When the average particle diameter of the inorganic oxide microparticles is too large, the organic-inorganic composite antifog layer may become opaque, whereas when the average particle diameter is too small, the inorganic oxide microparticles aggregate, thus making it difficult to uniformly disperse the microparticles. From this viewpoint, the average particle diameter of the inorganic oxide microparticles is preferably 1 to 20 nm, and more preferably 5 to 20 nm. It should be noted that the average particle diameter of the inorganic oxide microparticles in the form of primary particles is taken as the average particle diameter of the inorganic oxide microparticles described herein. The average particle diameter of the inorganic oxide microparticles is determined by measuring, through observation using a scanning electron microscope, particle diameters of fifty randomly selected microparticles and employing the average value thereof. If the content of inorganic oxide microparticles is large, the amount of water absorption in the entire organic-inorganic composite antifog layer may decrease, and the organic-inorganic composite antifog layer may become opaque. It is preferable to add inorganic oxide microparticles such that the amount thereof is 0 to 50 parts by weight, more preferably 2 to 30 parts by weight, further preferably 5 to 25 parts by weight, and particularly preferably 10 to 20 parts by weight, with respect to 100 parts by weight of the water absorbent resin.

Hydrolyzable Metallic Compound Having No Water Repellent Group

The antifog layer may contain a metal oxide component derived from a hydrolyzable metallic compound that does not have any water repellent group (water repellent group-free hydrolyzable compound). A preferable water repellent group-free hydrolyzable metallic compound is a hydrolyzable silicon compound that does not have any water repellent group. The hydrolyzable silicon compound that does not have any water repellent group is, for example, at least one silicon compound (having no water repellent group) selected from silicon alkoxide, chlorosilane, acetoxysilane, alkenyloxysilane, and aminosilane, and silicon alkoxide that does not have any water repellent group is preferable. It should be noted that an example of the alkenyloxysilane is isopropenoxysilane.

The hydrolyzable silicon compound that does not have any water repellent group may be a compound represented by Formula (III) below.

$$SiY_4 \tag{III}$$

As described above, Y represents a hydrolyzable functional group, which is preferably at least one selected from an alkoxyl group, an acetoxy group, an alkenyloxy group, an amino group, and a halogen atom.

The water repellent group-free hydrolyzable metallic compound is hydrolyzed or partially hydrolyzed, and at least portions thereof are polycondensed. Thus, a metal oxide component in which metal atoms and oxygen atoms are linked is supplied. This component firmly joins metal oxide microparticles and the water absorbent resin, and can contribute to the enhancement of the abrasion resistance, hardness, water resistance, and the like of the antifog layer. The amount of the metal oxide component derived from the water repellent group-free hydrolyzable metallic compound is within a range of 0 to 40 parts by mass, preferably 0.1 to 30 parts by mass, more preferably 1 to 20 parts by mass, particularly preferably 3 to 10 parts by mass, and optionally 4 to 12 parts by mass, with respect to 100 parts by mass of the water absorbent resin.

A preferable example of the hydrolyzable silicon compound that does not have any water repellent group is tetraalkoxysilane, and more specifically, tetraalkoxysilane having an alkoxy group that has 1 to 4 carbon atoms. The tetraalkoxysilane is at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane, for example.

If the content of the metal oxide (silica) component derived from tetraalkoxysilane is excessively large, the antifog property of the antifog layer may be impaired. One reason for this is that the flexibility of the antifog layer is impaired, and thus the swelling and shrinkage of the antifog layer caused by the absorption and discharge of moisture are limited. It is preferable to add the metal oxide component derived from tetraalkoxysilane such that the amount thereof is within a range of 0 to 30 parts by mass, preferably 1 to 20 parts by mass, and more preferably 3 to 10 parts by mass, with respect to 100 parts by mass of the water absorbent resin.

Another preferable example of the hydrolyzable silicon compound that does not have any water repellent group is a silane coupling agent. The silane coupling agent is a silicon compound having reactive functional groups that are different from each other. It is preferable that the reactive functional groups include a hydrolyzable functional group. An example of the silane coupling agent is a silicon compound having an epoxy group and/or an amino group and a hydrolyzable functional group. Examples of preferable silane coupling agents include glycidyloxyalkyltrialkoxysilane and aminoalkyltrialkoxysilane. It is preferable that, in these silane coupling agents, an alkylene group that is directly linked to a silicon atom has 1 to 3 carbon atoms. A glycidyloxyalkyl group and an aminoalkyl group include hydrophilic functional groups (an epoxy group and an amino group), and therefore are not water-repellent as a whole although they include an alkylene group.

The silane coupling agent firmly couples the water absorbent resin, which is an organic component, and the metal oxide microparticles and the like, which are inorganic components, and can contribute to the enhancement of the abrasion resistance, hardness, water resistance, and the like of the antifog layer. However, when the content of the metal oxide (silica) component derived from the silane coupling agent is excessively large, the antifog property of the antifog layer is impaired, and the antifog layer may become opaque in some cases. It is preferable to add the metal oxide component derived from the silane coupling agent such that the amount thereof is within a range of 0 to 10 parts by mass, preferably 0.05 to 5 parts by mass, and more preferably 0.1 to 2 parts by mass, with respect to 100 parts by mass of the water absorbent resin.

Cross-Linked Structure

The antifog layer may also include a cross-linked structure formed using a cross-linking agent, which is preferably at least one type of cross-linking agent selected from an organic boron compound, an organic titanium compound, and an organic zirconium compound. The introduction of the cross-linked structure enhances the abrasion resistance, scratch resistance, and water resistance of the antifog layer. From another viewpoint, the introduction of the cross-linked structure facilitates the improvement of the durability of the antifog layer without impairing the antifog performance.

When the cross-linked structure formed using a cross-linking agent is introduced into the antifog layer in which the metal oxide component is a silica component, the antifog layer may contain metal atoms other than silicon, preferably boron, titanium, or zirconium, in addition to silicon.

The type of the cross-linking agent is not particularly limited as long as it can cross-link the water absorbent resin used. Here, only examples of organic titanium compounds are listed. The organic titanium compound is, for example, at least one selected from titanium alkoxides, titanium chelate-based compounds, and titanium acylate. Examples of titanium alkoxides include titanium tetraisopropoxide, titanium tetra-n-butoxide, and titanium tetraoctoxide. Examples of titanium chelate-based compounds include titanium acetylacetonate, titanium ethyl acetoacetate, titanium octyleneglycol, titanium triethanolamine, and titanium lactate. The titanium lactate may be an ammonium salt thereof (titanium lactate ammonium). Titanium acylate is, for example, titanium stearate. A preferable organic titanium compound is a titanium chelate-based compound, particularly titanium lactate.

When the water absorbent resin is polyvinyl acetal, a preferable cross-linking agent is an organic titanium compound, particularly titanium lactate.

Other Optional Components

Other additives may also be blended into the antifog layer. Examples of the additives include glycols such as glycerin and ethylene glycol that have the function of improving the antifog property. A surfactant, a leveling agent, an ultraviolet absorbing agent, a coloring agent, an antifoaming agent, an antiseptic agent, and the like may be used as the additives.

Undercoat Layer

The antifog layer can be directly layered on each functional layer 3 or 4, but a configuration is also possible in which an undercoat layer is formed on the functional layer 3 or 4 and the antifog layer is layered on the undercoat layer. When the antifog layer is layered above each functional layer 3 or 4 via the undercoat layer, the antifog layer is unlikely to separate from the functional layer. A silane coupling agent or the like can be used to form the undercoat layer, for example.

Thickness

The thickness of the organic-inorganic composite antifog layer can be adjusted as appropriate according to the required antifog characteristics and the like. The thickness of the organic-inorganic composite antifog layer is preferably 1 to 20 μm, more preferably 2 to 15 μm, further preferably 2 to 12 μm, and particularly preferably 3 to 10 μm. When the thickness of the antifog layer is 1 μm or more, the antifog effect can be sufficiently achieved. On the other hand, when the antifog layer is too thick, a reflected image may be distorted due to unevenness in the thickness of the antifog layer. Also, the antifog layer is formed from a resin material as described above and has birefringence, and accordingly, when the antifog layer is too thick, a reflected image may be blurred.

3-2. Method for Forming Antifog Layer

There is no particular limitation on the method for forming the antifog layer having the composition described above, but the antifog layer can be formed as follows, for example.

First, a coating solution for forming the organic-inorganic composite antifog layer described above (antifog layer forming solution) is prepared. Next, the coating solution is applied to the substrate 1 using a coating machine, and then dried in a first heating furnace.

When applying the coating solution, it is preferable to keep the atmosphere at a relative humidity of less than 60%, and more preferably 40% or less. By keeping the relative humidity low, it is possible to prevent the organic-inorganic composite antifog layer from absorbing moisture excessively from the atmosphere. When a large amount of moisture is absorbed from the atmosphere, the strength of the organic-inorganic composite antifog layer may be impaired by water infiltrated and remained in the matrix of the organic-inorganic composite antifog layer.

In the first heating furnace, the substrate is preferably heated at a temperature not higher than 200° C., for example, 50° C. to 150° C. The substrate is preferably heated for 1 to 20 minutes, and more preferably 2 to 10 minutes. The substrate may also be heated a plurality of times. For example, the substrate may be heated for 3 to 5 minutes two or more times. Thus, the coating solution is fired and a cross-linked structure is formed by the water absorbent resin and Si. However, the cross-linked structure is not a firm structure obtained by completely firing the coating solution, and the antifog layer is provisionally generated.

Next, the substrate dried as described above is immersed in a water bath. As a result, the antifog layer swells on the substrate 1, and some cross-linked points are cut off. Also, impurities contained in the water absorbent resin, such as Na and Cl are removed. Furthermore, a water absorbent resin composition that is not cross-linked is also removed. The temperature of water filling the water bath can be set to 10° C. to 80° C., for example, more preferably 20° C. to 60° C., and particularly preferably 25° C. to 50° C. The water temperature may be lower than 10° C., but an effect of removing alkaline components may be reduced when the water temperature is lower than 10° C. On the other hand, when the water temperature is higher than 80° C., the amount of water vapor generated through evaporation of the water in the water bath increases, and loads on facilities and the working environment may become high. From these viewpoints, the water temperature is particularly preferably 25° C. to 50° C. to reduce loads on facilities and the environment while keeping the effect of removing alkaline components relatively high. The period for which the substrate is immersed in the water bath can be set to 1 to 30 minutes, for example, more preferably 3 to 20 minutes, and particularly preferably 3 to 10 minutes. When the substrate is immersed for a long period, alkaline components can be sufficiently removed even if the water temperature is low and the effect of removing alkaline components is low as described above. However, the production efficiency decreases when the substrate is immersed for a long period, and therefore, it is particularly preferable to immerse the substrate for 3 to 10 minutes. For the reasons described above, the substrate can be immersed in water at a temperature of 25° C. to 50° C. for about 3 to 10 minutes, for example. Such water treatment may also be performed a plurality of times. When the water treatment is performed a plurality of times, effects that will be described later can be achieved using a small water bath without the need for increasing the size of the water bath.

Subsequently, the substrate 1 is heated in a second heating furnace. In the second heating furnace, the swelled antifog layer is fired and the cross-linked structure formed by the water absorbent resin and Si remaining in the antifog layer is strengthened. Similarly to the first heating furnace described above, in the second heating furnace, the substrate is preferably heated at a temperature not higher than 200° C., for example, 50° C. to 150° C. The substrate is preferably heated longer than the period for which it is heated in the first heating furnace. For example, the substrate is preferably heated for 3 to 60 minutes, and more preferably 5 to 30 minutes. Thus, the antifog layer is sufficiently fired and completed.

3-3. Antifog Layer Provided with Hydrophilic Layer

The antifog layer described above mainly has the moisture absorbing function, and it is also possible to further form a hydrophilic layer on the antifog layer (moisture absorbing layer). The following describes the hydrophilic layer in detail.

Although various configurations can be adopted for the hydrophilic layer, the hydrophilic layer may be configured to contain, for example, polyether-modified dimethylsiloxane represented by Formula (A) below,

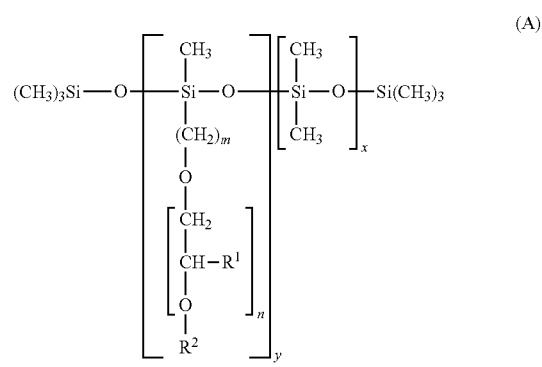

where m, n, x, and y are integers of 1 or more independently of each other, and $R^1$ is a hydrogen atom or a methyl group, and $R^2$ is an alkyl group having 1 to 3 carbon atoms.

Furthermore, the following configuration may be adopted in Formula (A).

(1) The average molecular weight of polyether-modified dimethylsiloxane can be set to 3,000 to 300,000.

(2) m can be set to an integer selected from 2 and 3. That is, a connection portion between a silicone main chain, its side chain, and a polyether side chain may be an ethylene group or a propylene group. Such polyether-modified dimethylsiloxane can be obtained by adding dimethylpolysiloxane, in which some methyl groups in the dimethylpolysiloxane main chain are substituted with hydrogen atoms, to a polyether that has a vinyl group at its end.

(3) The polymerization degree n of the polyether side chain can be set to an integer from 3 to 600. That is, the polyether side chain may be polyethylene glycol having a molecular weight of about 200 to 20000 (polymerization degree of about 4 to 400).

(4) The ratio of modification y/(x+y) can be set to 0.01 or more and less than 1. That is, at least one of 100 siloxane units may be modified, and a configuration is also possible in which all siloxane units (excluding units at both ends) are modified.

The hydrophilic layer described above can be formed using a conventionally known method as appropriate. For example, cotton cloth may be impregnated with polyether-modified dimethylsiloxane as is or a diluted solution of polyether-modified dimethylsiloxane diluted with a solvent in which it is soluble, and the cotton cloth may be rubbed against the antifog layer to apply polyether-modified dimethylsiloxane. Alternatively, the diluted solution may be applied to the antifog layer through spray coating, flow coating, or the like, and dried by volatilizing the solvent.

The following effect can be achieved by forming the hydrophilic layer. For example, when moisture absorption by the hygroscopic antifog layer has progressed and the antifog layer is saturated, water vapor attaches to the hydrophilic layer, and a water layer is formed on the surface of the hydrophilic layer due to its hydrophilicity. Accordingly, after the antifog layer is saturated, a water layer is formed but fogging due to waterdrops can be suppressed.

3-4. Antifog Layer Having Hydrophilic Function

Next, an antifog layer that has a hydrophilic function will be described. The antifog layer described above in section 3-3 is provided with the hydrophilic layer that is formed separately from the antifog layer, whereas the antifog layer described in this section has a hydrophilic function and is constituted by a single layer.

The antifog layer is obtained by dispersing a hydrophilizing agent within the above-described antifog layer having the moisture absorbing function. This enhances hydrophilicity of the surface of the antifog layer. That is, even when the water absorbent resin described above is saturated with water, a water layer is formed on the surface of the antifog layer, and the antifog property can be maintained. When a hydrophilic layer is formed as a separate layer on the antifog layer as described above, an apparent refractive index of the hydrophilic layer is higher than that of the antifog layer, and therefore, glittering may occur. On the other hand, when the hydrophilizing agent is dispersed within the antifog layer, glittering can be suppressed. Furthermore, when the hydrophilizing agent is dispersed within the antifog layer, the hydrophilizing agent inside the antifog layer appears at the surface of the antifog layer even if some of the hydrophilizing agent is removed from the surface by being wiped off, for example, and therefore, the hydrophilic performance can be maintained. There is no particular limitation on the hydrophilizing agent, and any of anionic surfactants, cationic surfactants, nonionic surfactants, and amphoteric surfactants can be used. For example, sodium dialkylsulfosuccinate can be used as an anionic surfactant.

The antifog layer can contain a solvent having a high boiling point, for example, a boiling point of at least 100° C. and not higher than 300° C. In this case, even if the antifog layer is fired at 100° C. or a higher temperature during its formation, the solvent can be dispersed within the antifog layer. The hydrophilizing agent dissolves in the solvent, and accordingly, the hydrophilizing agent can be dispersed within the antifog layer. Incidentally, a resin that contains an organic material is commonly resistant to temperatures not higher than 300° C. because the resin turns yellow or is thermally decomposed. Accordingly, if a solvent having a boiling point higher than 300° C. is used and the antifog layer is fired at a temperature not higher than 300° C., too much solvent may remain in the antifog layer. Therefore, the solvent used here preferably has a boiling point not higher than 300° C. Preferably, the solvent has an alcohol group, which facilitates dispersion of the hydrophilizing agent in the solvent. Specifically, propylene glycol, polyethylene glycol, triethylene glycol, or glycerin can be used, for example.

The antifog layer described above can be formed as follows, for example. First, the solvent and the hydrophilizing agent described above are added to the above-described coating solution for forming an organic-inorganic composite antifog layer to prepare an antifog layer forming solution. Then, the antifog layer forming solution is applied to the substrate 1 through spin coating, roll coating, spray coating, or the like. Next, the substrate is cooled and dried with air blow, and then fired in a heating furnace. Thereafter, the substrate is air-cooled at room temperature, and thus the antifog layer is completed. The antifog layer contains the hydrophilizing agent therein, and therefore can be formed by performing each of the application step and the firing step once. Accordingly, the production time can be significantly reduced. The solvent having a high boiling point is preferably added to the coating solution at a ratio of 0.1 to 40 mass %, for example, and the hydrophilizing agent is preferably added to the coating solution at a ratio of 0.01 to 1.0 mass %, for example.

3-5. Antifog Layer Mainly Composed of Inorganic Compound 3-5-1. Composition of Antifog Layer Next, an antifog layer that contains an inorganic compound as the main component will be described. This antifog layer has irregularities on its surface, and accordingly exhibits the antifog performance as a result of a water layer being formed on its surface under high-humidity conditions. That is, the antifog layer functions as what is known as a hydrophilic antifog layer. Also, due to the irregularities, the apparent refractive index can be reduced and reflection from the surface can be suppressed.

The antifog layer can contain inorganic microparticles and an inorganic binder, for example. Furthermore, the antifog layer can also contain photocatalyst microparticles. When photocatalyst microparticles are contained, hydrocarbon and organic dirt deposited on the surface of the antifog layer are decomposed and the formation of a water layer is facilitated. For example, when hydrocarbon or organic dirt is deposited on the surface of the antifog layer, the contact angle of water increases, and optical distortion may occur when waterdrops attach to the surface. However, if photocatalyst particles are added, dirt on the surface is decomposed, and accordingly, it is possible to suppress optical distortion that occurs due to attachment of water.

Inorganic microparticles can be formed from, for example, $SiO_2$, $ZrO_2$, $CeO_2$, $ZnO$, $Al_2O_3$, $Nb_2O_3$, $Y_2O_3$, or MgO. Inorganic microparticles preferably have a particle diameter of 1 to 500 nm, more preferably 5 to 200 nm, and further preferably 10 to 150 nm, for example. When the particle diameter of inorganic microparticles is large, the haze ratio increases, which is not preferable.

The inorganic binder may contain a metal oxide component derived from a hydrolyzable metallic compound. A preferable hydrolyzable metallic compound is a hydrolyzable silicon compound that does not have any water repellent group. The hydrolyzable silicon compound that does not have any water repellent group is, for example, at least one silicon compound (having no water repellent group) selected from silicon alkoxide, chlorosilane, acetoxysilane, alkenyloxysilane, and aminosilane, and silicon alkoxide that does not have any water repellent group is preferable. An example of the alkenyloxysilane is isopropenoxysilane.

The hydrolyzable silicon compound that does not have any water repellent group may be a compound represented by Formula (III) below.

As described above, Y represents a hydrolyzable functional group, which is preferably at least one selected from an alkoxyl group, an acetoxy group, an alkenyloxy group, an amino group, and a halogen atom.

The water repellent group-free hydrolyzable metallic compound is hydrolyzed or partially hydrolyzed, and at least portions thereof are polycondensed. Thus, a metal oxide component in which metal atoms and oxygen atoms are linked is supplied. This component firmly joins inorganic microparticles and photocatalyst microparticles to each other and to the substrate or a substrate film, and can contribute to enhancement of the abrasion resistance, hardness, water resistance, and the like of the antifog layer.

A preferable example of the hydrolyzable silicon compound that does not have any water repellent group is tetraalkoxysilane, and more specifically, tetraalkoxysilane having an alkoxy group that has 1 to 4 carbon atoms. The tetraalkoxysilane is at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane, for example.

Another preferable example of the hydrolyzable silicon compound that does not have any water repellent group is a silane coupling agent. The silane coupling agent is a silicon compound having reactive functional groups that are different from each other. It is preferable that the reactive functional groups include a hydrolyzable functional group. An example of the silane coupling agent is a silicon compound having an epoxy group and/or an amino group and a hydrolyzable functional group. Examples of preferable silane coupling agents include glycidyloxyalkyltrialkoxysilane and aminoalkyltrialkoxysilane. It is preferable that, in these silane coupling agents, an alkylene group that is directly linked to a silicon atom has 1 to 3 carbon atoms. A glycidyloxyalkyl group and an aminoalkyl group include hydrophilic functional groups (an epoxy group and an amino group), and therefore are not water-repellent as a whole although they include an alkylene group.

Photocatalyst microparticles can be formed from an oxide or oxynitride that contains any of titanium, tungsten, and iron as the main component, for example. Photocatalyst microparticles preferably have a particle diameter of 1 to 50 nm, for example, more preferably 2 to 20 nm, and further preferably 5 to 10 nm.

The content of the inorganic microparticles is preferably 0 mass % or more and 60 mass % or less, for example, more preferably 10 mass % or more and 50 mass % or less, further preferably 20 mass % or more and 40 mass % or less, and particularly preferably 20 mass % or more and 28 mass % or less. The content of the inorganic binder is preferably 20 mass % or more and 70 mass % or less, for example, and more preferably 30 mass % or more and 50 mass % or less. The content of the photocatalyst microparticles is preferably 10 mass % or more and 50 mass % or less, for example, and more preferably 20 mass % or more and 40 mass % or less. A configuration is also possible in which the antifog layer does not contain inorganic microparticles and contains the inorganic binder and photocatalyst microparticles.

The thickness of the antifog layer is preferably 10 to 500 nm, for example, more preferably 20 to 250 nm, and further preferably 50 to 200 nm. In particular, the thickness of the antifog layer is preferably no greater than twice the particle diameter of inorganic microparticles. This is because, if the thickness of the antifog layer is greater than or equal to twice the particle diameter of inorganic microparticles, the inorganic microparticles are stacked in the thickness direction of the antifog layer and bonding between the inorganic microparticles becomes weak, and therefore, the scratch resistance may be impaired.

3-5-2. Optical Characteristics of Transparent Laminate

The cover member including the antifog layer described above preferably has a visible light transmittance of 85% or more, and more preferably 88% or more. In particular, a difference between the transmittance of the substrate and the minimum transmittance of the cover member in the visible light wavelength range is preferably 5% or less, and more preferably 2% or less. On the other hand, the cover member preferably has a visible light reflectance of 10% or less, and more preferably 7% or less. In particular, a difference between the reflectance of the substrate and the maximum reflectance of the cover member in the visible light wavelength range is preferably 5% or less, and more preferably 2% or less. Furthermore, the reflectance of the cover member in the visible light wavelength range preferably satisfies the following formula: 1 maximum reflectance/minimum reflectance 1.5. A reflection curve affects the color of the transparent laminate. That is, if the reflectance is high with respect to a specific wavelength, the cover member is colored and may not be acceptable depending on its intended use. However, when the above formula is satisfied, the coloring can be suppressed. It is possible to adjust the ratio: maximum reflectance/minimum reflectance by changing the thickness and the composition of the antifog layer.

The transparent laminate preferably has a haze ratio of 1.0 or less, more preferably 0.5 or less, and particularly preferably 0.3 or less. The transparent laminate having such a haze ratio can be suitably used as a cover member for a camera or the like.

3-6. Other Form of Antifog Layer

In the above-described examples, the antifog layer is directly layered on the substrate 1, but it is also possible to attach an antifog sheet to the substrate 1. The antifog sheet includes a transparent substrate film in the form of a sheet, the above-described antifog layer layered on a surface of the substrate film, and a transparent sticky layer layered on the other surface of the substrate film. The antifog sheet can be fixed by fixing the sticky layer to the first main surface 11 of the substrate 1.

The substrate film can be formed from a transparent resin sheet made of polyethylene or polyethylene terephthalate, for example. The thickness of the substrate film can be set to 75 to 100 μm, for example. The sticky layer can be constituted by an acrylic or silicone-based sticky layer, for example.

It is also possible to omit the substrate film. First, a release film is prepared, and the antifog layer and the sticky layer are layered in this order on the release film. Thereafter, the sticky layer is attached to the first main surface 11 of the substrate 1 and then the release film is removed. Thus, the sticky layer and the antifog layer are layered in this order on the substrate 1. Accordingly, in this case, the substrate film is unnecessary, and distortion that occurs due to the substrate film can be avoided. It should be noted that a protective film may be attached to the sticky layer, and the sticky layer may be attached to the substrate after the protective film is removed when the antifog sheet is to be used.

3-7. Surface Roughness

The surface roughness Ra of the antifog layer can be set to 1 to 1000 nm, for example, and preferably 10 to 1000 nm. When the surface roughness Ra is 1 nm or more, an antireflection effect can be achieved. In particular, the antireflection effect is high in the visible light band including light having wavelengths of 400 to 800 nm. However, when the surface roughness Ra is larger than 1000 nm, light scattering occurs, which is not preferable.

4. Applications

Figure 2:
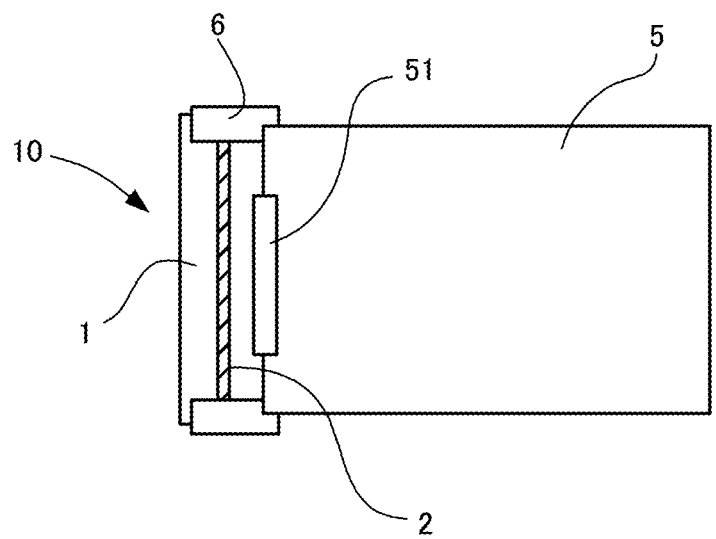
FIG. 2 is a schematic diagram showing an example in which the cover member is arranged in front of a lens of an image capturing apparatus.

The cover member described above can be used for various uses. For example, as shown in FIG. 2, the cover member can be used as the cover member 10 that covers a lens 51 of an image capturing apparatus 5. In this case, a bracket 6 may be attached to the above-described cover member 10 as appropriate to attach the cover member 10 to the lens. A closed space is formed in front of the lens by the cover member 10 and the bracket 6. In this case, the cover member 10 is arranged such that the first main surface 11 of the substrate 1 faces the closed space. Since the first functional layer 2 is layered on the first main surface 11, the first main surface 11 can be kept from fogging due to a temperature difference or an air pressure difference between the closed space and the outside thereof. Thus, it is possible to prevent problems that would be caused by fogging of the cover member 10 when capturing an image.

Figure 3:
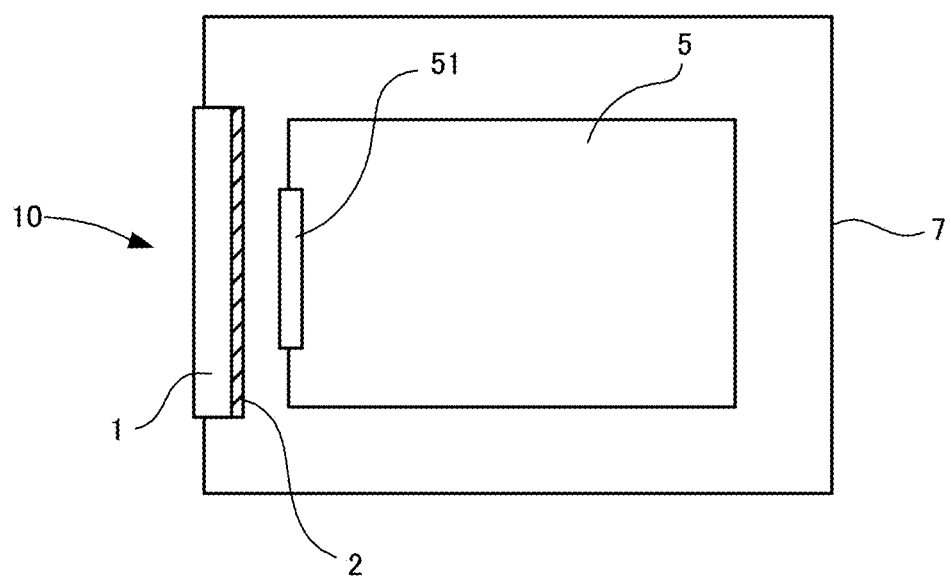
FIG. 3 is a schematic diagram showing an example in which the cover member is arranged in front of a lens of an image capturing apparatus housed in a housing.

As shown in FIG. 3, for example, the cover member 10 is applicable to an image capturing apparatus 5 that is installed inside a housing 7 and is insulated from the outside air by the housing 7 and the cover member 10. Examples of such image capturing apparatuses include a bullet monitoring camera and a dome monitoring camera. In this case, the cover member 10 is disposed in front of the lens of the image capturing apparatus 5. In such a monitoring camera, a difference arises between temperatures on both sides of the cover member 10 due to heat generation from the image capturing apparatus 5 and changes in the surrounding environment. Therefore, the cover member 10 is in an environment in which dew condensation and fogging are likely to occur.

Also, in the case of an image capturing apparatus mounted on a flying object that is subjected to significant changes in the air pressure in the surrounding environment, dew condensation is likely to occur due to a change in the air pressure. Therefore, the cover member 10 according to the present embodiment can be suitably used as a cover member for a monitoring camera or an apparatus mounted on a flying object.

The cover member is not only used under conditions where the surrounding environment significantly changes as described above, but can also be used as a cover member for an image capturing apparatus that is mounted on a movable body such as an automobile or a cover member for any other common image capturing apparatus, for example.

In particular, a transparent laminate that includes the above-described antifog layer containing an inorganic compound as the main component is excellent not only in the antifog performance but also in the durability against separation of the antifog layer, weather resistance, and water resistance as described later, and therefore can be suitably used as a cover member for various cameras including a monitoring camera that is used outdoors, for example. Furthermore, in the case where the antifog layer contains photocatalyst microparticles, when the antifog layer is irradiated with ultraviolet rays, organic dirt attached to the surface of the antifog layer can be decomposed and the antifog performance can be restored. In such a cover member, the antifog layer may be layered on either surface of the substrate. That is, the antifog layer may be layered on either the surface of the substrate facing the lens of the camera or the surface of the substrate facing outward. When the antifog layer is layered on the surface of the substrate facing the lens of the camera, it is preferable to provide the monitoring camera with an irradiation device for irradiating the antifog layer with ultraviolet rays. In this case, it is possible to forcibly decompose organic dirt attached to the antifog layer when necessary.

5. Others

In the above-described examples, the first main surface 11 of the substrate 1 faces the lens of the camera, which is the image capturing apparatus, and accordingly, the second main surface 12 is exposed to the outside air. Therefore, for example, a water-repellent layer or a hydrophilic layer (third functional layer) may be formed on the second main surface 12 so that waterdrops will not attach to the second main surface 12. The water-repellent layer and the hydrophilic layer can be formed by coating the second main surface with a known water-repellent film and a known hydrophilic film. This also applies to the second embodiment, which will be described later.

EXAMPLES

1. Antifog Layer Constituted by Organic-Inorganic Composite film

The following describes an example according to the first embodiment that includes, as the first functional layer, an antifog layer that is constituted by an organic-inorganic composite film. However, the present invention is not limited to the following example.

The following cover member was produced as Example 1.
(1) Substrate: A float glass plate with a thickness of 1.1 mm was used.
(2) First functional layer: The following antifog layer was formed on the first main surface of the substrate.

(i) Preparation of Antifog Layer Forming Coating Solution

An antifog layer forming coating solution was prepared by placing, into a glass container, 62.5 mass % of a polyvinyl acetal resin-containing solution ("S-LEC KX-5" manufactured by SEKISUI CHEMICAL CO., LTD., solid content: 8 mass %, degree of acetalization: 9 mol %, including an acetal structure derived from benzaldehyde), 0.37 mass % of n-hexyl trimethoxy silane (HTMS, "KBM-3063" manufactured by Shin-Etsu Chemical Co., Ltd.), 1.04 mass % of tetraethoxysilane (TEOS, "KBE-04" manufactured by Shin-Etsu Chemical Co., Ltd.), 20.44 mass % of an alcohol solvent ("SOLMIX AP-7" manufactured by Japan Alcohol Corporation), 15.63 mass % of purified water, 0.01 mass % of hydrochloric acid used as an acid catalyst, and 0.01 mass % of a leveling agent ("KP-341" manufactured by Shin-Etsu Chemical Co., Ltd.) and stirring the mixture for 3 hours at room temperature (25° C.).

(ii) Antifog Layer Forming Step

First, the antifog layer forming coating solution prepared as described above was applied to the substrate and the substrate was passed through a heating furnace at 90° C. for 5 minutes. Next, the substrate was immersed in water at 50° C. for 10 minutes, and then heated in a heating furnace at 110° C. for 10 minutes. Thus, a moisture absorbing layer of the antifog layer was formed.

Next, a coating solution was prepared by diluting polyether-modified dimethylsiloxane ("BYK-333" manufactured by BYK Japan KK) with an alcohol mixture solvent ("SOLMIX AP-7" manufactured by Japan Alcohol Trading CO., LTD.) such that the concentration of polyether-modified dimethylsiloxane was 1 wt %, the coating solution was applied to the substrate through flow coating such that the entire water absorbing layer of the tilted substrate got wet, and then the substrate was dried in that state. Thus, a hydrophilic layer was formed. The thickness of the hydrophilic layer was 10 nm.

2. Antifog Layer Mainly Composed of Inorganic Compound

Next, the following describes examples of cover members each including, as the first functional layer, an antifog layer that contains an inorganic compound as the main component.

Float glass plates with a thickness of 1.1 mm were prepared as substrates, and antifog layers having the following compositions were formed on surfaces on one side of the substrates. The antifog layers were formed by applying antifog layer forming coating solutions through spin coating (rotation frequency: 3000 rpm) and then firing the substrates under the following conditions.

TABLE 1

| | Composition (weight %) | | | Firing conditions | |
|---|---|---|---|---|---|
| | $SiO_2$ microparticles | $TiO_2$ microparticles | $SiO_2$ binder | Temperature (° C.) | Time (min) |
| Ex. 1 | 52% | 20% | 28% | 200 | 30 |
| Ex. 2 | 49% | 25% | 26% | 200 | 30 |
| Ex. 3 | 46% | 30% | 25% | 200 | 30 |
| Ex. 4 | 21% | 30% | 49% | 200 | 30 |
| Ex. 5 | 7% | 30% | 63% | 200 | 30 |
| Ex. 6 | 0% | 30% | 70% | 200 | 30 |
| Ex. 7 | 46% | 30% | 25% | 300 | 30 |
| Ex. 8 | 35% | 30% | 35% | 300 | 30 |
| Ex. 9 | 28% | 30% | 42% | 300 | 30 |
| Ex. 10 | 21% | 30% | 49% | 300 | 30 |
| Ex. 11 | 24% | 40% | 36% | 300 | 30 |

The following tests were carried out on the cover members according to Examples 1 to 11 formed as described above.

2-1. Antifog Performance Test

A container was filled with hot water having a temperature of 80° C. to 100° C., and each cover member was placed at a distance of 5 cm from the surface of the hot water such that the antifog layer faced the surface of the hot water. The antifog performance was evaluated based on the following criterion.

A: A uniform water layer was formed on the antifog layer in 3 to 5 seconds.
B: A water layer was formed on the antifog layer in 3 to 5 seconds, but distortion was observed.
C: The antifog layer was fogged in 3 seconds.

The antifog performance test was carried out again after irradiating each cover member with ultraviolet rays of 60 mW/cm² for 10 minutes.
Results were as follows.

TABLE 2

| | Antifog performance | Antifog performance after UV irradiation |
|---|---|---|
| Ex. 1 | A | — |
| Ex. 2 | A | — |
| Ex. 3 | A | — |
| Ex. 4 | C | A |

TABLE 2-continued

| | Antifog performance | Antifog performance after UV irradiation |
|---|---|---|
| Ex. 5 | C | A |
| Ex. 6 | C | A |
| Ex. 7 | A | — |
| Ex. 8 | A | — |
| Ex. 9 | A | — |
| Ex. 10 | A | — |
| Ex. 11 | A | — |

It is thought that the antifog performance was low in Examples 4 to 6 because the content of $SiO_2$ microparticles was small. However, after the cover members were irradiated with ultraviolet rays, dirt on the surfaces was decomposed and the same level of antifog performance as that in Examples 1 to 3 and 7 to 11 was achieved. Therefore, it is thought that the cover members of Examples 4 to 6 were sufficiently applicable to practical applications. It should be noted that the intensity of ultraviolet rays, which was 60 mW/cm², is higher than that of ultraviolet rays included in sunlight. This is because the UV irradiation was performed as an acceleration test. Accordingly, it is thought that even if the intensity of ultraviolet rays is 1 mW/cm², which is equivalent to that of ultraviolet rays included in sunlight, when the cover members of Examples 4 to 6 are irradiated with ultraviolet rays for a long period, the antifog performance will be achieved. This also applies to tests described below.

2-2. Abrasion Test

Toraysee manufactured by Toray Industries, Inc., and impregnated with alcohol ("A-10" manufactured by FUTABA PURE CHEMICAL CO, LTD.) was prepared as a cloth, and the cloth was moved back and forth 10 times over a distance of 5 cm on the antifog layer of each Example while being pressed against the antifog layer with a load of 300 g. Then, the antifog performance test described above was carried out and whether or not the antifog layer was removed was checked through visual observation. Also, the antifog performance test was carried out again after irradiating each cover member with ultraviolet rays of 60 mW/cm² for 20 minutes. Results were as follows.

TABLE 3

| | Antifog performance | Antifog performance after UV irradiation | Removal |
|---|---|---|---|
| Ex. 1 | C | A (remaining portion of antifog layer) | Yes |
| Ex. 2 | C | A (remaining portion of antifog layer) | Yes |
| Ex. 3 | C | A (remaining portion of antifog layer) | Yes |
| Ex. 4 | C | A | No |
| Ex. 5 | C | A | No |
| Ex. 6 | C | A | No |
| Ex. 7 | A | — | No |
| Ex. 8 | A | — | No |
| Ex. 9 | A | — | No |
| Ex. 10 | A | — | No |
| Ex. 11 | A | — | No |

Removal of the antifog layer was observed in Examples 1 to 3 in the abrasion test. It is thought that this was because the content of $SiO_2$ microparticles was large. However, in the cases where the content of $SiO_2$ microparticles was large but the substrate was fired at a high temperature, as is the case with Examples 7 to 9, removal of the antifog layer was not observed, and it is thought that a firm antifog layer in which $SiO_2$ microparticles were sufficiently cross-linked was formed. It was found that, particularly the antifog layers in Examples 4 to 11 would be prevented from being removed even when wiped to remove dirt on the antifog layers, for example.

Regarding the antifog performance, it is thought that, in Examples 1 to 6, organic substances contained in the $SiO_2$ binder remained at the surface of the antifog layer because the firing temperature was low, and therefore, the contact angle on the surface was high and the antifog performance was not exhibited. On the other hand, it is thought that, in Examples 7 to 11, the firing temperature was high, and therefore, organic substances contained in the $SiO_2$ binder were thermally decomposed and removed from the surface, and the antifog performance was exhibited. Also, it is thought that in a durability test like this, the antifog performance is degraded as a result of the antifog layer being contaminated by hydrocarbon attached to the surface of the antifog layer or an organic residue that is derived from the $SiO_2$ binder and appears at the surface of the antifog layer.

2-3. Weather Resistance Test

The cover member of each Example was housed in a thermostatic chamber at a temperature of 80° C. and a humidity of 80% for 48 hours. Thereafter, the antifog performance test described above was carried out. Thereafter, the cover member was irradiated with ultraviolet rays of 1 mW/cm², and the time it took until the antifog performance of level A described above was exhibited was measured. The time was evaluated based on the following criterion.

P: less than 10 hours
Q: 10 to 30 hours
R: more than 30 hours

Results were as follows.

TABLE 4

|  | Antifog performance | Antifog performance after UV irradiation |
| --- | --- | --- |
| Ex. 1 | C | Q |
| Ex. 2 | C | Q |
| Ex. 3 | C | Q |
| Ex. 4 | C | R |
| Ex. 5 | C | R |
| Ex. 6 | C | R |
| Ex. 7 | C | Q |
| Ex. 8 | C | Q |
| Ex. 9 | C | Q |
| Ex. 10 | C | Q |
| Ex. 11 | C | P |

In the antifog performance test carried out after the cover members were taken out of the thermostatic chamber, the antifog performance was low (level C) in all of Examples 1 to 11. On the other hand, after the cover members were irradiated with ultraviolet rays, the antifog performance was enhanced in Examples 1 to 3 and 7 to 11, but the antifog performance remained low in Examples 4 to 6. It is thought that this was because the content of the inorganic binder was large. According to the inventors of the present invention, in Examples 1 to 3, the larger the content of $TiO_2$ microparticles was, the shorter the time it took until the antifog performance was exhibited was, although details of this are not shown in Table 4. That is, the time it took until the antifog performance was exhibited after the UV irradiation was shorter in Examples 2 and 3 than in Example 1. The above results show that, when the present invention is applied to a cover member for a monitoring camera, for example, the cover member will exhibit high antifog performance in general when irradiated with ultraviolet rays, even in an outdoor environment at a high temperature and a high humidity.

2-4. Immersion Test

The cover member of each Example was immersed in water (20° C.±5° C.) for 180 hours. Thereafter, the antifog performance test described above was carried out. Results were as follows.

TABLE 5

|  | Antifog performance |
| --- | --- |
| Ex. 1 | A, B |
| Ex. 2 | A, B |
| Ex. 3 | A, B |
| Ex. 4 | A, B |
| Ex. 5 | A, B |
| Ex. 6 | A, B |
| Ex. 7 | A |
| Ex. 8 | A |
| Ex. 9 | A |
| Ex. 10 | A |
| Ex. 11 | A |

The evaluation results "A, B" for Examples 1 to 5 indicate that the antifog performance was evaluated as level B for a portion of the antifog layer. However, it was found that all of the cover members had high antifog performance. Therefore, it is thought that the cover members according to the present invention are suitable to be used outdoors where the cover members may be exposed to rainwater.

The results of the above tests show that all of the cover members of Examples 1 to 11 are suitable to be used outdoors. In particular, the cover members of Examples 8 to 11 exhibited high antifog performance even in harsh environments.

2-5. Transmittance

Figure 4:
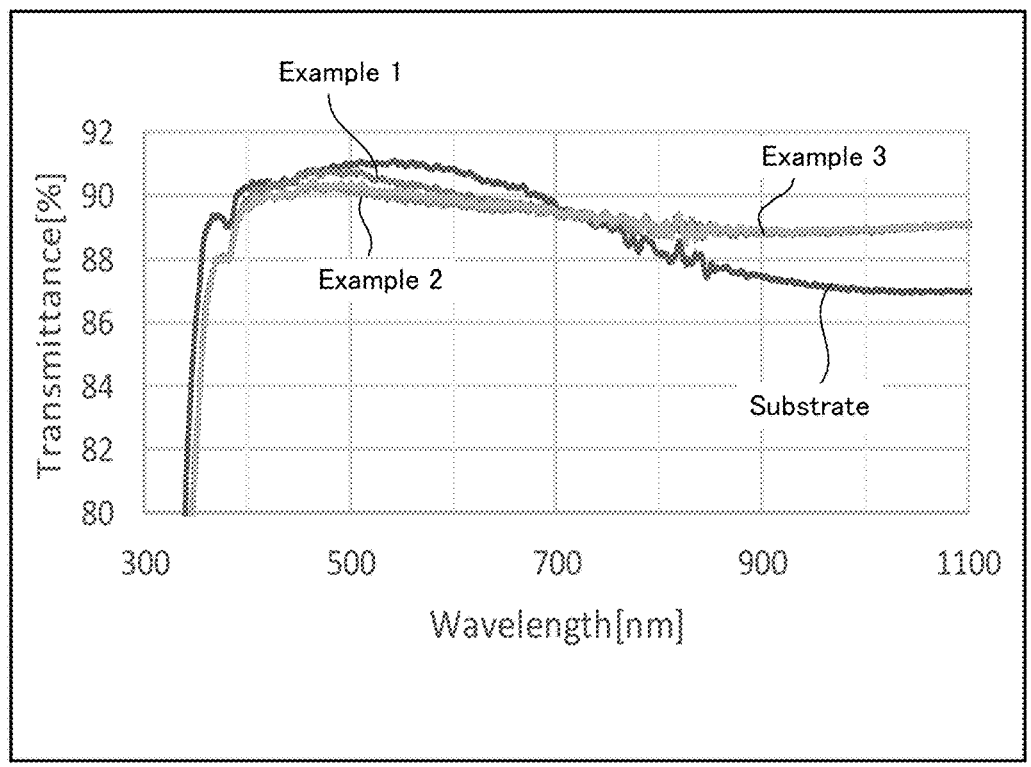
FIG. 4 is a graph showing transmittances of Examples 1 to 3 and a substrate.

The transmittance was measured for the cover members of Examples 1 to 3 and the substrate based on JIS R3106. Results are shown in FIG. 4. As shown in FIG. 4, in the visible light wavelength range (about 380 to 780 nm), each of the cover members of Examples 1 to 3 had a transmittance of about 89% or more. Since the transmittance of the substrate, which was a glass plate, was about 91%, the difference between the transmittance of the substrate and the transmittance of each of the cover members of Examples 1 to 3 was 2% or less, and it was found that each of the cover members of Examples 1 to 3 had a high transmittance.

2-6. Reflectance

Figure 5:
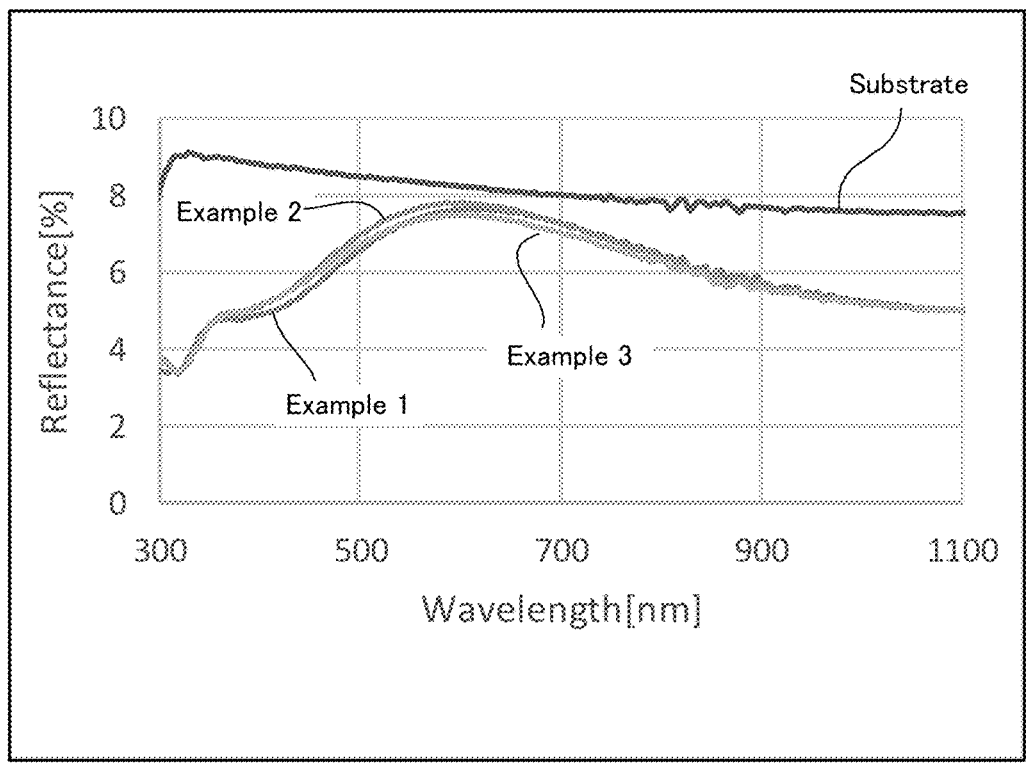
FIG. 5 is a graph showing reflectances of Examples 1 to 3 and the substrate.

The reflectance was measured for the cover members of Examples 1 to 3 and the substrate based on JIS R3106. Results are shown in FIG. 5. As shown in FIG. 5, in the visible light wavelength range (about 380 to 780 nm), each of the cover members of Examples 1 to 3 had a reflectance of about 6% to 8%. The reflectance of the substrate, which was a glass plate, was about 8% to 9%. It was found that each of the cover members of Examples 1 to 3 had a low reflectance that was lower than the reflectance of the substrate by about 2%.

3. Antifog Layer Having Hydrophilic Function

Next, the following describes cover members of Examples 12 to 20 in which the above-described antifog layer having the hydrophilic function was formed as the first functional layer.

A float glass plate with a thickness of 1.1 mm was prepared as a substrate, and the antifog layer was formed on a surface of the substrate. The antifog layer was formed by applying an antifog layer forming coating solution described below through spin coating, cooling the substrate with air blow for 10 minutes, and then firing the substrate in a heating furnace. The substrate was fired at 100° C. for 30 minutes in the heating furnace. Thereafter, the substrate was air-cooled at room temperature. Thus, the antifog layer was formed. The thickness of the antifog layer was about 10 μm.

The antifog layer forming coating solution was prepared as follows. The antifog layer forming coating solution was prepared by placing, into a glass container, 60.24 mass % (solid content concentration: 5.0 mass %) of a polyvinyl acetal resin-containing solution ("S-LEC KX-5" manufactured by SEKISUI CHEMICAL CO., LTD.), 20.0 mass % of a solvent having a high boiling point (shown in Table 6), 0.28 mass % (solid content concentration: 0.2 mass %) of 3-glycidoxypropyltrimethoxysilane (GPTMS, "KBM-403" manufactured by Shin-Etsu Chemical Co., Ltd.), 1.04 mass % (solid content concentration: 0.30 mass %) of tetraethoxysilane (TEOS, "KBE-04" manufactured by Shin-Etsu Chemical Co., Ltd.), 6.32 mass % of an alcohol solvent ("SOLMIX AP-7" manufactured by Japan Alcohol Corporation), 11.87 mass % of purified water, 0.10 to 0.40 mass % (solid content concentration: 0.10 to 0.40 mass %, see Table 6) of a surfactant ("RAPISOL" manufactured by NOF CORPORATION), 0.01 mass % of hydrochloric acid used as an acid catalyst, 0.01 mass % of a leveling agent ("KP-341" manufactured by Shin-Etsu Chemical Co., Ltd.), 0.01 mass % of a leveling agent ("KP-112" manufactured by Shin-Etsu Chemical Co., Ltd.), 0.01 mass % of a leveling agent ("DOWSIL8526 Additive" manufactured by Dow Chemical Japan Limited), and 0.01 mass % of a leveling agent ("BKY-349" manufactured by BYK Japan KK) and stirring the mixture for 3 hours at room temperature (25° C.).

Propylene glycol (PG), polyethylene glycol (PEG), and triethylene glycol (TEG) were used as solvents having high boiling points. Antifog layer forming coating solutions used in Examples 12 to 20 contained the following solvents having high boiling points (the addition ratio is expressed in the unit of mass %).

TABLE 6

|  | PG | PEG | TEG | Surfactant |
| --- | --- | --- | --- | --- |
| Ex. 12 | 20 | 0 | 0 | 0.1 |
| Ex. 13 | 20 | 0 | 0 | 0.2 |
| Ex. 14 | 20 | 0 | 0 | 0.4 |
| Ex. 15 | 0 | 5 | 0 | 0.2 |
| Ex. 16 | 15 | 5 | 0 | 0.2 |
| Ex. 17 | 0 | 0 | 5 | 0.2 |
| Ex. 18 | 0 | 0 | 10 | 0.2 |
| Ex. 19 | 15 | 0 | 5 | 0.2 |
| Ex. 20 | 10 | 0 | 10 | 0.2 |

The following tests were carried out on the antifog layers formed as described above.

3-1. Antifog Performance Test

A container was filled with hot water having a temperature of 80° C. to 100° C., and each cover member was placed at a distance of 5 cm from the surface of the hot water such that the antifog layer faced the surface of the hot water. Whether or not the antifog layer was kept from fogging for at least 10 seconds (antifog performance), whether or not a water layer was formed in 1 second, and whether or not the antifog layer had no problems in terms of its appearance were checked. The appearance was checked by visual observation to confirm whether the surface of the antifog layer was smooth and whether the surface was free from distortion and creases. Results were as follows, in which OK indicates that there were no problems.

TABLE 7

|  | Antifog performance | Water layer | Appearance |
| --- | --- | --- | --- |
| Ex. 12 | OK | OK | OK |
| Ex. 13 | OK | OK | OK |
| Ex. 14 | OK | OK | OK |
| Ex. 15 | OK | OK | OK |
| Ex. 16 | OK | OK | OK |
| Ex. 17 | OK | OK | OK |
| Ex. 18 | OK | OK | OK |
| Ex. 19 | OK | OK | OK |
| Ex. 20 | OK | OK | OK |

The above results show that the antifog layers according to Examples 12 to 20 showed sufficiently high antifog performance.

3-2. Abrasion Test

Toraysee manufactured by Toray Industries, Inc., and impregnated with alcohol ("A-10" manufactured by FUTABA PURE CHEMICAL CO, LTD.) was prepared as a cloth, and the cloth was moved back and forth 10 times over a distance of 5 cm on the antifog layer of each Example while being pressed against the antifog layer with a load of 300 g. Then, the antifog performance test was carried out in the same manner as that described above in the section 3-1. Results were as follows.

TABLE 8

|  | Antifog performance | Water layer | Appearance |
| --- | --- | --- | --- |
| Ex. 12 | OK | OK | OK |
| Ex. 13 | OK | OK | OK |
| Ex. 14 | OK | OK | OK |
| Ex. 15 | Distortion | OK | OK |
| Ex. 16 | Distortion | OK | OK |
| Ex. 17 | OK | OK | OK |
| Ex. 18 | Distortion | OK | OK |
| Ex. 19 | OK | OK | OK |
| Ex. 20 | Distortion | OK | OK |

According to the results shown in Table 8, distortion was observed in the surfaces of the antifog layers of Examples 15, 16, 18, and 20 after wiping, but the antifog performance was maintained in the other Examples.

3-3. Weather Resistance Test

The cover member of each Example was housed in a thermostatic chamber at a temperature of 85° C. and a humidity of 85% for 48 hours. Then, the antifog performance test was carried out in the same manner as that described above in the section 3-1. Results were as follows.

TABLE 9

|  | Antifog performance | Water layer | Appearance |
| --- | --- | --- | --- |
| Ex. 12 | OK | OK | OK |
| Ex. 13 | OK | OK | OK |
| Ex. 14 | OK | OK | OK |
| Ex. 15 | OK | OK | OK |
| Ex. 16 | OK | OK | OK |
| Ex. 17 | OK | OK | OK |
| Ex. 18 | OK | OK | OK |
| Ex. 19 | OK | OK | OK |
| Ex. 20 | OK | OK | OK |

B. Second Embodiment

Figure 6:
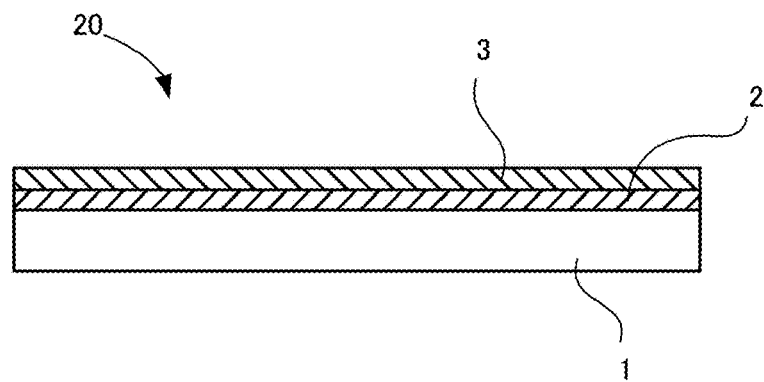
FIG. 6 is a cross-sectional view showing a second embodiment of a cover member according to the present invention.

The following describes a second embodiment of the case in which a transparent laminate according to the present invention is applied to a cover member, with reference to the drawings. FIG. 6 is a cross-sectional view of a cover member according to the second embodiment.

The cover member 20 according to the present embodiment differs from the cover member according to the first embodiment in that a second functional layer 3 is further layered on the first functional layer 2 described above, and the other configurations are as described in the first embodiment. The following describes the second functional layer.

1. Outline of Cover Member

As shown in FIG. 6, the cover member 20 according to the present embodiment includes the substrate 1, the first functional layer 2 layered on the first main surface 11 of the substrate 1, and the second functional layer 3 layered on the first functional layer 2. The substrate 1 and the first functional layer 2 are the same as those described in the first embodiment.

For example, an antireflection film, an antiglare film, an antistatic film, an antibacterial film, or the like can be adopted as the second functional layer 3. The following describes an example in which an antifog layer is adopted as the first functional layer 2 and an antireflection layer is adopted as the second functional layer 3.

The antifog layer constituting the first functional layer 2 is not an antifog layer that is provided with a hydrophilic layer at the top surface as described in the first embodiment, but is a moisture absorbing layer that is constituted by an organic-inorganic composite antifog layer, for example. When an antireflection layer is layered on such a hygroscopic antifog layer, the moisture absorbing effect may be hindered. Therefore, the antireflection layer according to the present embodiment includes voids that form passages for water vapor to reach the antifog layer 2. The following describes details.

2. Second Functional Layer

Figure 7:
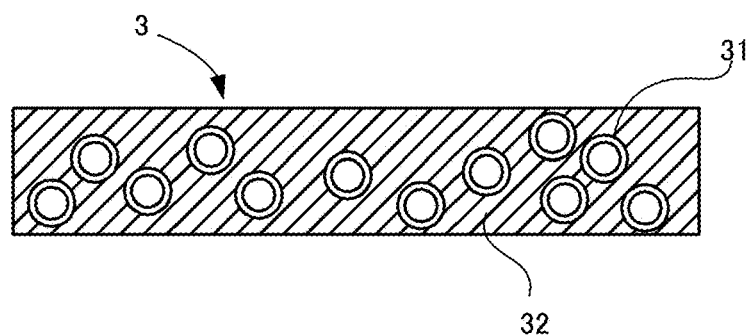
FIG. 7 is a cross-sectional view showing a schematic configuration of a second functional layer that functions as an antireflection layer.

FIG. 7 is a cross-sectional view of the second functional layer. As shown in FIG. 6, the second functional layer 3 includes hollow particles 31 and a binder 32. The hollow particles 31 are formed from a material that has a refractive index of 1.15 to 2.70. The binder 32 is constituted by at least polysilsesquioxane and binds the hollow particles 31 together. In the second functional layer 3, an absorbance obtained by hydrocarbon groups that are not directly linked to silicon atoms, an absorbance obtained by bonds between a silicon atom and a non-reactive functional group, and an absorbance obtained by bonds between a silicon atom and a hydroxy group, which are determined based on the attenuated total reflection (ATR) method using a Fourier transform infrared spectrophotometer, will be denoted by Ia, Ib, and Ic, respectively. The second functional layer 3 satisfies at least one of the following conditions: Ib/Ia≥0.7 and Ib/Ic≥0.3. In the present specification, Ib/Ia is also referred to as an "organic-inorganic parameter (D)", and Ib/Ic is also referred to as a "hydrophobicity parameter (H)". The absorbances Ia, Ib, and Ic can be determined using a method described in Examples based on an absorption spectrum obtained using the ATR method, for example.

The smaller the number of hydrocarbon groups that are not directly linked to silicon atoms contained in the binder 32 is, the larger the organic-inorganic parameter (D) becomes. When the number of hydrocarbon groups that are not directly linked to silicon atoms contained in the binder 32 is small, the Si—O—Si network in the binder 32 is dense, and the density of inorganic components in the binder 32 is high. Therefore, the hollow particles 31 are firmly fixed by the Si—O—Si network. Accordingly, when the second functional layer 3 satisfies the condition: Ib/Ia≥0.7, the hollow particles 31 are firmly fixed in the second functional layer 3, and the second functional layer 3 has characteristics that are advantageous for low-refractive index coating. If the hollow particles are not sufficiently fixed in the layer, the mechanical strength of the layer may be impaired.

The smaller the number of hydroxy groups linked to silicon atoms in the binder 32 is, the larger the hydrophobicity parameter (H) becomes. For example, when the network constituted by Si—O—Si develops through condensation of hydroxy groups in a raw material of the binder 32, the number of hydroxy groups linked to silicon atoms in the binder 32 decreases. When the hydrophobicity parameter (H) is greater than or equal to a predetermined value, the network constituted by Si—O—Si has developed densely in the binder 32, and the hollow particles 31 can be firmly fixed by the network. Accordingly, when the second functional layer 3 satisfies the condition: Ib/Ic≥0.3, the hollow particles 31 are firmly fixed in the second functional layer 3, and the second functional layer 3 has characteristics that are advantageous for low-refractive index coating.

It is desirable that the second functional layer 3 further satisfies the conditions of Ib/Ia≥0.7 and Ib/Ic≥0.3. In this case, the hollow particles 31 are firmly fixed in the second functional layer 3 more reliably, and the second functional layer 3 has characteristics that are advantageous for low-refractive index coating.

In the case where the binder 32 includes silanol groups (Si—OH), the silanol groups form hydrogen bonds with silanol groups that are present at the surface of the glass plate 1, and therefore, affinity is high. Accordingly, if the hydrophobicity parameter (H) of the layer is no greater than a predetermined value, the layer easily adheres to the glass plate 1 as well. In order for the second functional layer 3 to adhere well to both of a substrate that has a hydrophilic surface and a substrate that has a hydrophobic surface, it is more desirable that the second functional layer 3 satisfies the condition of 0.3≤Ib/Ic≤2.0.

In the second functional layer 3, a first absorbance, a second absorbance, and a third absorbance that are obtained by bonds between an oxygen atom and two silicon atoms and determined based on the ATR method will be denoted by Id, Ie, and If, respectively. The first absorbance Id corresponds to a first wavenumber. The second absorbance Ie corresponds to a second wavenumber that is larger than the first wavenumber. The third absorbance If corresponds to a third wavenumber that is larger than the second wavenumber. It is desirable that the second functional layer 3 satisfies at least one of the following conditions: Id/Ib≤60, Ie/Ib≤20, and If/Ib≤174. In the present specification, Id/Ib is also referred to as a first network parameter (N1), Ie/Ib is also referred to as a second network parameter (N2), and If/Ib is also referred to as a third network parameter (N3).

The first wavenumber is the wavenumber at which a maximal value of the absorption spectrum appears within a range of 455±50 cm$^{-1}$, for example. The second wavenumber is the wavenumber at which a maximal value of the absorption spectrum appears within a range of 780±50 cm$^{-1}$, for example. The third wavenumber is the wavenumber at which a maximal value of the absorption spectrum appears within a range of 1065±50 cm$^{-1}$, for example.

The larger the number of bonds (Si—O—Si) between an oxygen atom and two silicon atoms in the binder 32 is, the larger the first network parameter (N1), the second network parameter (N2), and the third network parameter (N3) become. The more the Si—O—Si network generated through condensation of hydroxy groups develops in the raw material of the binder 32, the larger the first network parameter (N1), the second network parameter (N2), and the third network parameter (N3) become. On the other hand, in order to keep film formability good, it is important to suppress agglomeration of the hollow particles to keep the thickness of a coating film uniform. In order to suppress agglomeration of the hollow particles, it is desirable to prevent excessive development of the Si—O—Si network. From this viewpoint, it is desirable that the second functional layer 3 satisfies at least one of the following conditions: N1≤60, N2≤20, and N3≤174. In this case, the second functional layer 3 can be formed favorably, and an antireflection structure having good antireflection performance can be realized by the second functional layer 3.

It is more desirable that the second functional layer 3 further satisfies the conditions of Id/Ib≤60, Ie/Ib≤20, and If/Ib≤174.

Polysilsesquioxane constituting the binder 32 typically has a non-reactive functional group that is linked to a silicon atom. In order for the polysilsesquioxane constituting the binder 32 to exhibit appropriate hydrophobic action, the non-reactive functional group is a hydrophobic functional group such as an alkyl group, for example. It is desirable that the polysilsesquioxane constituting the binder 32 is polysilsesquioxane in which a hydrocarbon group having 16 or less carbon atoms is linked, as a non-reactive functional group, to a silicon atom. In this case, the non-reactive functional group is not bulky, and accordingly, the Si—O—Si network is likely to be formed densely.

The binder 32 may further contain silica, for example. In this case, hydrophobic action is likely to be exhibited by the polysilsesquioxane contained in the binder 32, and hydrophilic action is likely to be exhibited by silica contained in the binder 32. Therefore, it is possible to adjust hydrophilicity or hydrophobicity of the second functional layer 3 to an appropriate level by adjusting the ratio (Mp/Ms) of the amount of substance Mp of polysilsesquioxane to the amount of substance Ms of silica in the binder 32. This makes it possible to appropriately form the second functional layer 3 on a substrate having a hydrophilic surface, such as a glass substrate, and a substrate having a hydrophobic surface, such as a resin substrate. From this viewpoint, the ratio (Mp/Ms) of the amount of substance Mp of polysilsesquioxane to the amount of substance Ms of silica in the binder 32 is 3/7 or more, for example, preferably 1 to 9, and more preferably 3/2 to 4.

The hollow particles 31 are not particularly limited as long as the hollow particles have a hollow structure. For example, the hollow particles 31 have a spherical shape, a tubular shape, or a sheet-like shape. The hollow particles 31 have an average particle diameter (primary particle diameter) of 10 to 150 nm, for example. In this case, the hollow particles 31 are likely to disperse uniformly in the second functional layer 3. The average particle diameter of the hollow particles 31 can be determined by calculating an arithmetic average of particle diameters of 50 or more hollow particles 31 observed using a transmission electron microscope (TEM) or a scanning electron microscope (SEM), for example. The particle diameter of each particle refers to the maximum diameter thereof.

The hollow particles 31 preferably have an average particle diameter of 20 to 100 nm, and more preferably 30 to 70 nm. The maximum dimension of internal spaces in the hollow particles 31 is 5 to 100 nm, for example, preferably 10 to 70 nm, and more preferably 20 to 50 nm. It is desirable that the hollow particles 31 are monodispersed particles having a coefficient of variation of 0.1 or less.

The material of the hollow particles 31 may be an inorganic material or an organic material as long as the material has a refractive index of 1.15 to 2.70. The material of the hollow particles 31 preferably has a refractive index of 1.20 to 2.00, more preferably 1.30 to 1.50, and further preferably 1.38 to 1.46. In order for the hollow particles 31 to be less likely to be deformed by an external force, it is desirable that the hollow particles 31 are formed from an inorganic material. In this case, the hollow particles 31 are formed from at least one selected from the group consisting of silica, magnesium fluoride, alumina, aluminosilicate, titania, and zirconia, for example.

Out of these, the hollow particles 31 are preferably formed from silica or magnesium fluoride to provide an antireflection structure having high antireflection performance using the second functional layer 3 as low-refractive index coating. It should be noted that the refractive index of silica is 1.46, and the refractive index of magnesium fluoride is 1.38.

The structure and the material of the hollow particles 31 are determined such that the hollow particles 31 have a desired refractive index. For example, the material of the hollow particles 31 and the ratio of internal spaces to the volume of the hollow particles 31 as a whole are determined such that the hollow particles 31 have a desired refractive index. The hollow particles 31 have a refractive index of 1.10 to 1.40, for example, preferably 1.20 to 1.35, and more preferably 1.25 to 1.30. For example, when the ratio of internal spaces to the volume of hollow particles as a whole is the same between a plurality of types of hollow particles formed from materials having different refractive indexes, the refractive index of hollow particles that are formed from a material having a lower refractive index is lower than the refractive index of hollow particles that are formed from a material having a higher refractive index.

The refractive index of the hollow particles 31 can be measured using an immersion method (Becke line method), for example. For example, in the case where the hollow particles 31 are formed from silica, the refractive index of the hollow particles 31 can be measured as follows. (i) A dispersion medium of a dispersion liquid of the hollow particles 31 is evaporated and the hollow particles 31 are dried to obtain powder. (ii) The powder obtained in step (i) is mixed with various standard refractive index liquids having different refractive indexes, such as series A and series AA manufactured by GARGILL. (iii) When a liquid mixture obtained in step (ii) is transparent, the refractive index of a standard refractive index liquid used in that liquid mixture is taken to be the refractive index of the hollow particles 31.

The hollow particles 31 may be hollow particles that are commercially available, or may be produced using a predetermined method. For example, the hollow particles 31 may be produced by forming a shell around a core and removing the core. For example, a shell made of silica or magnesium fluoride is formed around a polymer core that has a particle diameter of several tens of nanometers. Thereafter, the polymer core is dissolved in a solvent or burned. Thus, the polymer core can be removed and hollow particles 31 made of silica or magnesium fluoride can be obtained. It is also possible to obtain hollow particles 31 made of magnesium fluoride by forming a shell using magnesium fluoride around a core made of silica, and dissolving the core made of silica in an alkaline solvent.

In the second functional layer 3, the ratio (Wh/Wb) of the mass Wh of the hollow particles 31 to the mass Wb of the binder 32 is 1/5 to 20, for example, preferably 1/3 to 10, and more preferably 1 to 5. In this case, it is possible to provide an antireflection structure having high antireflection performance using the second functional layer 3 as low-refractive index coating.

The thickness of the second functional layer 3 is not particularly limited, and is determined according to the wavelengths of light to be prevented from reflecting, for example. Specifically, when the center wavelength of wavelengths of light to be prevented from reflecting is represented by λ (nm), the thickness of the second functional layer 3 is set such that the optical film thickness (refractive index×physical film thickness) satisfies λ/4. For example, in order to prevent reflection of light that belongs to the visible light range (practically, wavelengths from 380 nm to 780 nm), when the center wavelength λ is taken to be 550 nm and the refractive index of a low-refractive index film to be used is 1.20, an optimum physical film thickness is 115 nm. The range of thicknesses of the second functional layer 3 that are effective to prevent reflection of visible light in practical use is 50 to 300 nm, preferably 70 to 200 nm, and more preferably 90 to 170 nm. With such a thickness, it is possible to provide an antireflection structure having high antireflection performance using the second functional layer 3 as low-refractive index coating. In order to prevent reflection of light that belongs to a region in the near-infrared range (e.g., wavelengths from 800 nm to 2500 nm) close to the visible light range and of which the center wavelength λ is 850 nm, when the refractive index of a low-refractive index film to be used is 1.20, an optimum physical film thickness is 177 nm. The range of thicknesses of the second functional layer 3 that are effective to prevent reflection of near-infrared light in practical use is 80 to 350 nm, preferably 130 to 250 nm, and more preferably 150 to 220 nm. With such a thickness, it is possible to provide an antireflection structure having high antireflection performance using the second functional layer 3 as low-refractive index coating. When a multi-layer film is used as the antireflection structure, a low-refractive index layer with a thickness of 50 nm or less may also be used. The physical film thickness of the low-refractive index film can be determined by measuring its cross section using an SEM, a TEM, or an ellipsometer, for example.

The second functional layer 3 has a refractive index of 1.45 or less, for example, and preferably 1.1 to 1.35. In this case, it is possible to provide an antireflection structure having high antireflection performance using the second functional layer 3 as low-refractive index coating. It is desirable that the second functional layer 3 has a refractive index of 1.30 or less, and more preferably 1.25 or less. From the viewpoint of reducing the refractive index of the second functional layer 3, the second functional layer 3 may include air spaces between the hollow particles 31 or in the binder 32. The refractive index of the second functional layer 3 can be determined using reflectance spectrometry, for example. It is possible to reduce the refractive index of the second functional layer 3 by increasing the ratio of air spaces (void ratio). The void ratio is 0 to 70 vol %, for example, preferably 10 to 50 vol %, and more preferably 20 to 50 vol %. This also applies to a second functional layer constituted by a plurality of layers, which will be described later.

The second functional layer 3 is constituted by, for example, a cured material obtained by curing a predetermined liquid composition. The liquid composition contains hollow particles, polysilsesquioxane, and a solvent. The hollow particles are formed from a material that has a refractive index of 1.15 to 2.70. At least one of the following conditions: Ib/Ia≥0.7 and Ib/Ic≥0.3 is satisfied by the cured material obtained by applying the liquid composition to a substrate and curing the liquid composition. The solvent contained in the liquid composition is, for example, an alcohol such as ethanol, methanol, 1-propanol, or 2-propanol, or water.

The solution for forming the second functional layer can be applied to the antifog layer, which is the first functional layer, using various methods such as spin coating, roll coating, or spray coating. However, in roll coating and spray coating, the solution needs to be levelled between application and firing, for example, and therefore, the time between application and firing is increased. Accordingly, the solvent may evaporate during this period and drying may progress in a non-uniform manner. Consequently, a difference in the refractive index or a difference in the film thickness may arise between a region of the binder where the solvent evaporated before a network is formed in the heating furnace and a region of the binder where the solvent is present when the network is formed.

Therefore, when coating is performed at high temperatures as in the above examples, it is preferable to use a solvent that has a high boiling point. In this case, it is possible to suppress volatilization of the solvent contained in the solution for forming the second functional layer, and accordingly, the refractive index and the thickness of the second functional layer can be made uniform. Also, the network is formed in the binder through a dehydrative condensation reaction or the like, and therefore, a firing temperature around 100° C. is preferable. Accordingly, the boiling point of the solvent having a high boiling point is preferably higher than or equal to 100° C. Also, the first functional layer contains an organic resin, and therefore, may turn yellow at 300° C. or higher temperatures. Accordingly, the second functional layer is preferably fired at a temperature not higher than 300° C. In this respect, if a solvent having a boiling point higher than or equal to 300° C. is used, a large amount of the solvent may remain after the second functional layer is fired. As a result, the refractive index of the second functional layer may change and desired optical characteristics may not be achieved. Therefore, the solvent having a high boiling point preferably has a boiling point that is at least 100° C. and not higher than 300° C.

The solvent having a high boiling point is not particularly limited, and may contain 1-methoxy-2-propanol or 3-methoxy-3-methyl-1-butanol as the main component, for example. The solvent having a high boiling point is preferably contained in the solution at a concentration of 1 ppb or more and 5 g/cm$^3$ or less, for example, more preferably 3 g/cm$^3$ or less, and further preferably 1 g/cm$^3$ or less. This is for the following reasons. The above-described solution for forming the second functional layer contains the solvent higher than the firing temperature, and therefore, the solvent remains in the second functional layer at a concentration of 1 ppb or more even after the second functional layer is fired. Here, if the solvent is contained at a concentration of 5 g/cm$^3$ or more in the second functional layer, the refractive index changes due to the remaining solvent, and the second functional layer may fail to function as an optical thin film. Therefore, the concentration of the solvent is preferably no greater than 5 g/cm$^3$. It should be noted that the volume of the second functional layer 3 is calculated from an average value of thicknesses measured at 10 points on the second functional layer 3 and the area of the second functional layer 3. The amount of the solvent having a high boiling point is calculated through analysis performed using a gas chromatograph. The concentration (g/cm³) of the solvent having a high boiling point in the second functional layer 3 is calculated from the calculated volume and amount of the solvent.

In the liquid composition, an organosilane compound having a fluoroalkyl group is unnecessary, and accordingly, phase separation is unlikely to occur in the liquid composition, and the liquid composition is likely to be uniform. Also, wettability of the liquid composition with respect to a substrate and a resin substrate is high, and an antireflection layer having a uniform structure is likely to be obtained using the liquid composition.

It is desirable that the cured material described above further satisfies the following conditions: Ib/Ia≥0.7 and Ib/Ic≥0.3.

It is desirable that the cured material satisfies at least one of the following conditions: Id/Ib≤60, Ie/Ib≤20, and If/Ib≤174.

It is more desirable that the cured material further satisfies the following conditions: Id/Ib≤60, Ie/Ib≤20, and If/Ib≤174.

Polysilsesquioxane contained in the liquid composition is, for example, polysilsesquioxane in which a hydrocarbon group having 16 or less carbon atoms is linked, as a non-reactive functional group, to a silicon atom.

Typically, characteristics of the hollow particles 31 contained in the second functional layer 3 also apply to the hollow particles contained in the liquid composition. Accordingly, the hollow particles contained in the liquid composition have an average particle diameter (primary particle diameter) of 10 to 150 nm, for example. Also, it is desirable that the hollow particles contained in the liquid composition are formed from at least one selected from the group consisting of silica, magnesium fluoride, alumina, aluminosilicate, titania, and zirconia.

The liquid composition may contain, for example, silica other than the hollow particles.

The second functional layer 3 is formed by, for example, applying the liquid composition to the first functional layer 2 and curing the liquid composition. Thus, a low-refractive index layer is formed by the second functional layer 3. With the use of the liquid composition, low-refractive index coating can be formed easily without the need for an organosilane compound having a fluoroalkyl group.

Polysilsesquioxane contained in the liquid composition is formed through hydrolysis and dehydration condensation of three-functional alkoxysilane contained in a raw material of the liquid composition, for example. In the case where the liquid composition contains silica other than the hollow particles, the silica is formed through hydrolysis and dehydration condensation of four-functional alkoxysilane contained in a raw material of the liquid composition, for example. The four-functional alkoxysilane forms silica ($SiO_2$) through reactions represented by Formula 1 and Formula 2 below, for example. $R_a$ represents an alkyl group. The three-functional alkoxysilane forms polysilsesquioxane ($R_bSiO_{3/2}$) through reactions represented by Formula 3 and Formula 4 below. $R_b$ represents a non-reactive functional group, and $R_c$ represents an alkyl group.

$$Si(OR_a)_4 + 4H_2O \rightarrow Si(OH)_4 + 4R_aOH \quad \text{(Formula 1)}$$

$$Si(OH)_4 \rightarrow SiO_2 + 2H_2O \quad \text{(Formula 2)}$$

$$R_bSi(OR_a)_3 + 3H_2O \rightarrow R_bSi(OH)_3 + 3R_cOH \quad \text{(Formula 3)}$$

$$R_bSi(OH)_3 \rightarrow R_bSiO_{3/2} + 3/2 H_2O \quad \text{(Formula 4)}$$

A carboxylic acid such as formic acid and acetic acid is included as a hydrolysis catalyst in raw materials of the liquid composition.

3. Adjustment of Refractive Index

In order to make the second functional layer 3 function appropriately as the antireflection layer, it is necessary to determine the refractive index of the second functional layer 3 taking the refractive index of the antifog layer, which is the first functional layer 2, into account. The refractive index of the antifog layer depends on its material, but is generally 1.5 to 1.6. In order to reduce the refractive index of the first functional layer 2 and the second functional layer 3 as a whole, it is known to set the refractive index of the second functional layer 3 to the square root of the refractive index of the first functional layer 1. For example, when the refractive index of the antifog layer is 1.55, the refractive index of the second functional layer 3 is preferably 1.24.

As described above, the second functional layer 3 is constituted by the hollow particles 31, the binder 32, and air spaces, and the refractive index of the second functional layer 3 can be reduced because the hollow particles including air are contained. Furthermore, air spaces are also included, and accordingly, it is possible to further reduce the refractive index by increasing the ratio of air spaces (void ratio). Therefore, by adjusting the ratio of hollow particles and the void ratio, it is possible to set the refractive index of the second functional layer 3 to a value that is about +0.1 from the square root of the refractive index of the first functional layer 2, for example.

4. Second Functional Layer Constituted by a Plurality of Layers

Figure 8:
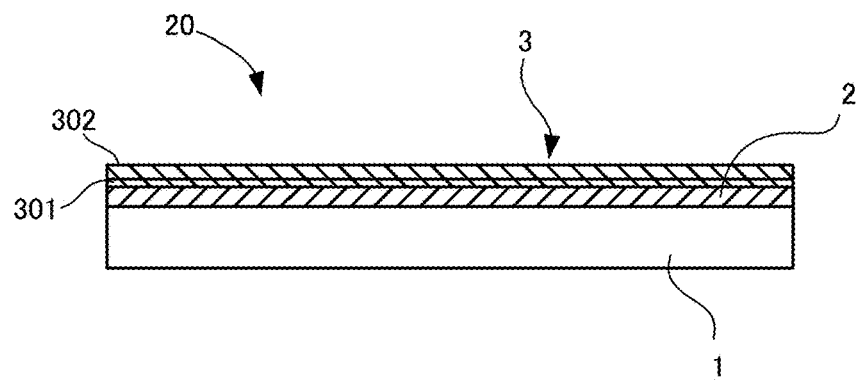
FIG. 8 is a cross-sectional view showing another example of a cover member according to the second embodiment.

In the above-described example, the second functional layer 3 is constituted by a single layer, but the second functional layer 3 may also be constituted by two layers. For example, as shown in FIG. 8, the second functional layer 3 may be constituted by a first layer 301 that is layered on the first functional layer 2 and a second layer 302 that is layered on the first layer 301. Here, in order to reduce the refractive index of the functional layers 2 and 3 as a whole, the refractive index of the first layer 301 is set lower than that of the antifog layer 2, and the refractive index of the second layer 302 is set lower than that of the first layer 301. The refractive index of the first layer 301 can be set to 1.35 to 1.55, for example, and the refractive index of the second layer 302 can be set to 1.10 to 1.25, for example.

In an example of such a configuration, the second layer 302 is formed by the above-described second functional layer 3 constituted by a single layer. The first layer 301 differs from the second layer 302 in that the hollow particles 31 are not contained, and is formed from at least one of polysilsesquioxane and silica, which constitutes the binder. The thickness of the second layer 302 can be set to 30 to 300 nm, for example. The first layer 301 does not contain hollow particles and air spaces, but water vapor passes through the first layer 301 because the binder 32 is porous. Accordingly, even when such a first layer 301 is formed, water vapor reaches the antifog layer 2 through the first layer 301 and the second layer 302. However, it is more difficult for water vapor to pass through the first layer 301 when compared with the second layer 302, and therefore, the thickness of the first layer 301 is preferably smaller than the thickness of the second layer 302.

As described above, when the second functional layer 3 is constituted by a plurality of layers, refractive indexes of the layers can be reduced stepwise from the first functional layer 2 side toward the outermost layer. Accordingly, the second functional layer 3 can be constituted by three or more layers.

5. Physical Properties of Second Functional Layer

In the case where the first functional layer 2 is an antifog layer, the volume of the first functional layer 2 may change due to absorption of moisture. Since the second functional layer 3 is formed on the first functional layer 2, the second functional layer 3 preferably conforms to a change in the volume of the first functional layer 2. If the second functional layer 3 does not sufficiently conforms to the change, cracks may be generated in the second functional layer 3. Therefore, when the antifog layer 2 has a flexural modulus of elasticity of 2 to 3 GPa, for example, the flexural modulus of elasticity of the second functional layer 3 is preferably within a range that overlaps the flexural modulus of elasticity of the antifog layer 2, for example, 1 to 10 GPa, and more preferably 1 to 4 GPa. That is, polysilsesquioxane that has a flexural modulus of elasticity (2 to 3 GPa) similar to that of the antifog layer 2 can be suitably used as the binder of the second functional layer 3.

Also, the first functional layer and the second functional layer may expand or contract due to a change in the temperature, and therefore, a difference between the linear expansion coefficient of the first functional layer 2 and the linear expansion coefficient of the second functional layer 3 is preferably 30 ppm/° C. For example, the antifog layer has a linear thermal expansion coefficient of 60 to 84 ppm/° C. and polysilsesquioxane has a linear thermal expansion coefficient of 40 to 70 ppm/° C., and accordingly, polysilsesquioxane can be used as the binder of the second functional layer 3. That is, even when the volume of the antifog layer increases or decreases by an amount of absorbed water, the first functional layer 2 and the second functional layer 3 can be kept from cracking.

6. Other Configuration

Figure 9:
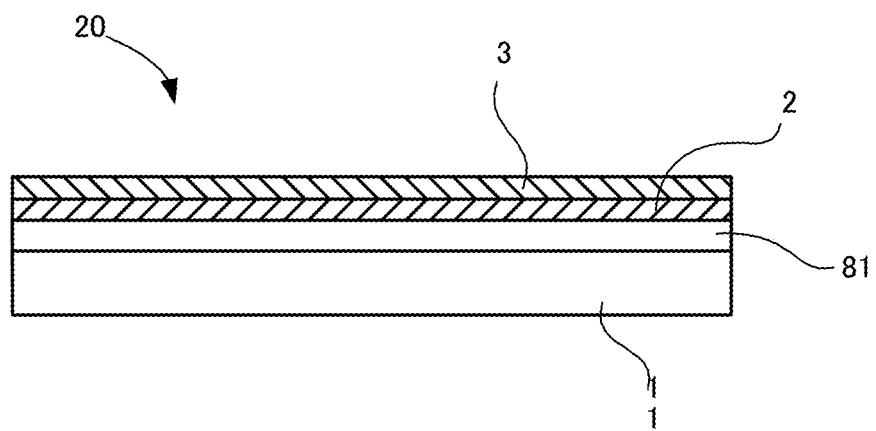
FIG. 9 is a cross-sectional view showing another example of a cover member according to the second embodiment.
Figure 10:
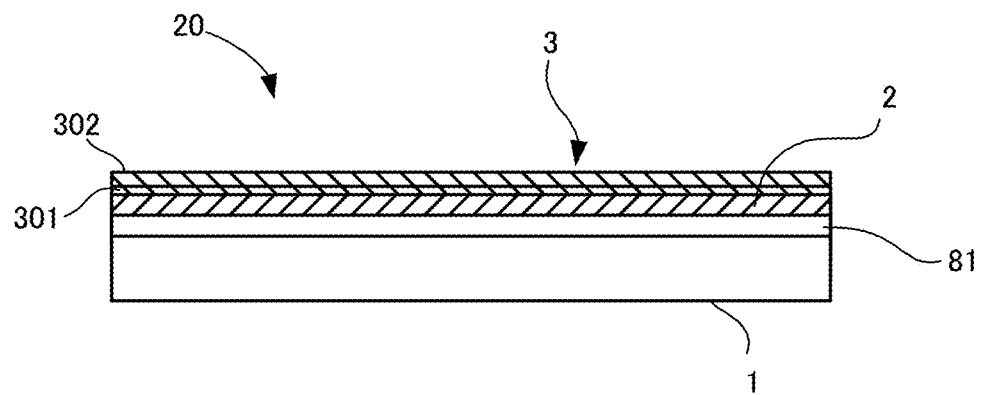
FIG. 10 is a cross-sectional view showing another example of a cover member according to the second embodiment.

Various configurations can be adopted for the first functional layer 2 and the second functional layer 3 according to the present embodiment. For example, in the case where the second functional layer 3 is constituted by a single layer, as shown in FIG. 9, it is possible to layer the antifog layer 2 and the antireflection layer 3 in this order on a substrate film 81, and then attach the substrate film 81 to the substrate 1 via a sticky layer (not shown). Similarly, in the case where the second functional layer 3 is constituted by a plurality of layers, as shown in FIG. 10, it is possible to layer the antifog layer 2, the first layer 301 and the second layer 302, which constitute the antireflection layer, in this order on the substrate film 81, and then attach the substrate film 81 to the substrate 1 via a sticky layer 82. The substrate film 81 and the sticky layer 82 are the same as those described in the first embodiment.

The transparent laminate according to the present invention may also contain an ultraviolet absorbing agent and/or an infrared absorbing agent. At least one of the first functional layer, the second functional layer, and the third functional layer described above may contain an ultraviolet absorbing agent and/or an infrared absorbing agent.

Alternatively, at least one of the substrate film, the sticky layer, and the antifog layer described above may contain an ultraviolet absorbing agent and/or an infrared absorbing agent.

Examples of the ultraviolet absorbing agent include organic substances such as benzotriazole compounds [2-(2'-hydroxy-5'-methylphenyl) benzotriazole, 2-(2'-hydroxy-3', 5'-di-t-butylphenyl) benzotriazole, and the like], benzophenone compounds [2,2',4,4'-tetrahydroxybenzophenone, 2,4-dihydroxybenzophenone, 2-hydroxy-4-methoxybenzophenone, 2-hydroxy-4-octoxybenzophenone, 5,5'-methylenebis (2-hydroxy-4-methoxybenzophenone), and the like], hydroxyphenyltriazine compounds [2-(2-hydroxy-4-octoxyphenyl)-4,6-bis(2,4-di-t-butylphenyl)-s-triazine, 2-(2-hydroxy-4-methoxyphenyl)-4,6-diphenyl-s-triazine, 2-(2-hydroxy-4-propoxy-5-methylphenyl)-4,6-bis(2, 4-di-t-but ylphenyl)-s-triazine, and the like], and cyanoacrylate compounds [ethyl-α-cyano-β,β-diphenylacrylate, methyl-2-cyano-3-methyl-3-(p-methoxyphenyl) acrylate, and the like]. A single ultraviolet absorbing agent may be used alone or two or more ultraviolet absorbing agents may be used in combination. The ultraviolet absorbing agent may be at least one organic pigment selected from a polymethine compound, an imidazoline compound, a coumarin compound, a naphthalimido compound, a perylene compound, an azo compound, an isoindolinone compound, a quinophthalone compound, and a quinoline compound. Organic ultraviolet absorbing agents are preferable. At least one type of ultraviolet absorbing agent selected from benzotriazole compounds, benzophenone compounds, hydroxyphenyltriazine compounds, and cyanoacrylate compounds are more preferable. Benzophenone compounds are further preferable. Benzophenone compounds dissolve well in an alcohol-based solvent contained in the coating solution for forming an organic-inorganic compound antifog layer, and disperses more uniformly in polyvinyl acetal resin, and therefore are preferable.

The ultraviolet absorbing agent preferably has a hydroxyl group, and it is more preferable that two or more hydroxyl groups are linked to a single benzene framework of the ultraviolet absorbing agent. The ultraviolet absorbing agent is preferably added in an amount of 0.1 to 50 parts by weight, more preferably 1.0 to 40 parts by weight, and further preferably 2 to 35 parts by weight, with respect to 100 parts by weight of the water absorbent resin.

Examples of the infrared absorbing agent include: organic infrared absorbing agents such as polymethine compounds, cyanine compounds, phthalocyanine compounds, naphthalocyanine compounds, naphthoquinone compounds, anthraquinone compounds, dithiol compounds, immonium compounds, diimonium compounds, aminium compounds, pyrylium compounds, selenium compounds, squarylium compounds, and a counter-ion complex formed of benzenedithiol metal complex anion and cyanine dye cation; and inorganic infrared absorbing agents such as tungsten oxide, tin oxide, indium oxide, magnesium oxide, titanium oxide, chromium oxide, zirconium oxide, nickel oxide, aluminum oxide, zinc oxide, iron oxide, ammonium oxide, lead oxide, bismuth oxide, lanthanum oxide, tungsten oxide, indium tin oxide, and antimony tin oxide. A single infrared absorbing agent may be used alone, or two or more infrared absorbing agents may be used in combination. Inorganic infrared absorbing agents are preferable, and it is more preferable to use indium tin oxide and/or antimony tin oxide.

Indium tin oxide and antimony tin oxide are stable in the coating solution for forming an organic-inorganic composite antifog layer, and disperse more uniformly in polyvinyl acetal resin, and therefore are preferable. The infrared absorbing agent is preferably added in an amount of 0.1 to 50 parts by weight, more preferably 1.0 to 40 parts by weight, and further preferably 2 to 35 parts by weight, with respect to 100 parts by weight of the water absorbent resin.

A configuration is also possible in which the first functional layer 2 and the second functional layer 3 are not adjacent to each other. For example, a primer layer, an absorbing layer that absorbs light having a specific wavelength, or a change layer may be provided between the first functional layer 2 and the second functional layer 3.

7. Applications

Similarly to the first embodiment described above, the cover member according to the present embodiment can be used as a cover member for an image capturing apparatus provided in a flying object such as a drone and a cover member for a monitoring camera. In particular, when the antireflection layer is formed as the second functional layer 3, the cover member can be suitably used as a cover member for an image capturing apparatus provided in a flying object that is often used outdoors and subjected to environmental changes. In particular, when the flying object steeply climbs, the pressure sharply changes. As can be understood from Boyle-Charles' law, when the pressure decreases, the temperature decreases. Accordingly, the transparent laminate according to the present invention that has the antifog function can be suitably used.

EXAMPLES

The following describes Examples 21 to 27 according to the second embodiment. However, the present invention is not limited to the following examples.

Example 21

The following cover member was produced as Example 21.
(1) Substrate: A float glass plate with a thickness of 2.8 mm was used.
(2) First functional layer: The antifog layer described in Example 1 of the first embodiment was formed on the first main surface of the substrate. However, the antifog layer was not provided with the hydrophilic layer. The first functional layer had a thickness of 8 μm and a refractive index of 1.55.
(3) Second functional layer: An antireflection layer constituted by a single layer described below was formed.

After the antifog layer was formed, a coating solution for forming the antireflection layer was prepared as described below. First, 0.6 g of tetraethoxysilane (TEOS, manufactured by Tokyo Chemical Industry Co., Ltd.), 1.18 g of methyltriethoxysilane (MTES, manufactured by Tokyo Chemical Industry Co., Ltd.), 0.82 g of 0.3 mass % formic acid (manufactured by KISHIDA CHEMICAL Co., Ltd.), 3 g of sol of hollow silica particles (manufactured by JGC Catalysts and Chemicals Ltd., product name: THRULYA 4110, silica solid content: about 25 mass %), and 22.4 g of ethanol (manufactured by KISHIDA CHEMICAL Co., Ltd.) were mixed and reacted with each other at 35° C. for 3 hours. Thus, the coating solution for forming the second functional layer according to Example 22 was obtained. In the sol of hollow silica particles, hollow silica particles had an average particle diameter of about 50 nm, the thickness of a shell made of silica was 10 to 20 nm, the maximum dimension of internal spaces in the hollow silica particles was about 10 to 30 nm, and the hollow silica particles had a refractive index of 1.25. The solid content in the coating solution included 0.6 mass % of silica derived from TEOS, 1.6 mass % of polymethylsilsesquioxane derived from MTES, and 2.6 mass % of hollow silica particles. The ratio of the amount of substance of MTES added in the preparation of the liquid composition according to Example 1 relative to the amount of substance of TEOS was 7/3. The ratio of the weight of hollow silica particles to the total weight of solid content of silica derived from TEOS and polymethylsilsesquioxane derived from MTES was 1.3/1.1.

Subsequently, the coating solution was applied to the antifog layer through spin coating. The obtained coating film had a good appearance and was uniform right after the application. Thereafter, the coating film was dried at 200° C. for 10 minutes in an oven. Thus, a cover member according to Example 22 was obtained.

The antireflection film had a thickness of 100 nm and a refractive index of 1.24±0.5. Volume ratios of the materials constituting the antireflection film were as follows. The volume ratio of hollow silica particles was 50 vol %, the volume ratio of the binder was 23 vol %, and the void ratio was 23 vol %.

Example 22

The following cover member was produced as Example 22.
(1) Substrate: A float glass plate with a thickness of 2.8 mm was used.
(2) First functional layer: The antifog layer described in Example 1 of the first embodiment was formed on the first main surface of the substrate. However, the antifog layer was not provided with the hydrophilic layer. The first functional layer had a thickness of 8 μm and a refractive index of 1.55.
(3) Second functional layer: An antireflection layer constituted by the following two layers was formed.

After the antifog layer was formed, a coating solution for forming the antireflection layer was prepared as described below. That is, a coating solution for forming a first layer was prepared in the same manner as the coating solution according to Example 21 in all aspects other than that the sol of hollow silica particles was not added. The coating solution was applied to the antifog layer through spin coating. Next, the coating film was dried at 200° C. for 10 minutes in an oven. Thus, a first layer was formed. The first layer had a refractive index of 1.46 and a thickness of 90 nm.

A coating solution similar to the coating solution according to Example 21 was applied to the first layer through spin coating. However, when compared to the coating solution according to Example 21, the ratio of hollow silica particles and the void ratio were increased. Next, the coating film was dried at 200° C. for 10 minutes in an oven. Thus, a second layer was formed. The second layer had a refractive index of 1.16 and a thickness of 95 nm.

Examples 23 to 27

The following cover members were produced as Examples 23 to 27.
(1) Substrate: Glanova (manufactured by Nippon Sheet Glass Co., Ltd.) with a thickness of 1.1 mm was used.
(2) First functional layer: The antifog layer described in Example 1 of the first embodiment was formed on the first main surface of the substrate. However, the antifog layer was not provided with the hydrophilic layer. The first functional layer had a thickness of 8 μm and a refractive index of 1.55.
(3) Second functional layer: An antireflection layer constituted by a single layer described below was formed.

After the antifog layer was formed, a coating solution for forming an antireflection layer having a composition (the unit is mass %) shown in Table 10 was prepared. First, tetraethoxysilane (TEOS, manufactured by Tokyo Chemical Industry Co., Ltd.), methyltriethoxysilane (MTES, manufactured by Tokyo Chemical Industry Co., Ltd.), 0.3 mass % formic acid (manufactured by KISHIDA CHEMICAL Co., Ltd.), sol of hollow silica particles (manufactured by JGC Catalysts and Chemicals Ltd., product name: THRULYA 4110, silica solid content: about 25 mass %), solvents, and a leveling agent were mixed and reacted with each other at 35° C. for 3 hours. Thus, coating solutions for forming second functional layers according to Examples 23 to 27 were obtained. In the sol of hollow silica particles, hollow silica particles had an average particle diameter of about 50 nm, the thickness of a shell made of silica was 10 to 20 nm, the maximum dimension of internal spaces in the hollow silica particles was about 10 to 30 nm, and the hollow silica particles had a refractive index of 1.25.

TABLE 10

| | Composition of coating solution | | | | | | | | | |
|---|---|---|---|---|---|---|---|---|---|---|
| | | | Aqueous solution of | Hollow micro- | | | | | Film composition (solid content) | |
| | TEOS | MTES | formic acid | particles | KP-341 | | Solvent | | $SiO_2$ | $CH_3SiO_{1.5}$ |
| Ex. 23 | 2.9 | 1.3 | 2.5 | 2.3 | 0.05 | A (1.1) | C (8.1) | B (81.7) | 86 | 14 |
| Ex. 24 | 1.5 | 0.7 | 1.3 | 2.3 | 0.05 | MIBK (9.1) | 0 | E (85.1) | 91 | 9 |
| Ex. 25 | 4.1 | 1.8 | 3.6 | 3 | 0.005 | A (1.5) | C (10.6) | F (75.3) | 86 | 14 |
| Ex. 26 | 1.5 | 0.7 | 1.3 | 2.2 | 0.05 | A (1.1) | C (7.9) | G (85.2) | 91 | 9 |
| Ex. 27 | 1.5 | 0.7 | 1.3 | 2.3 | 0.05 | MIBK (9.1) | 0 | H (85.1) | 91 | 9 |

The following are solvents, leveling agents, and the like shown in Table 10. Among the following, E to H represent solvents having high boiling points that are at least 100° C.
A: methanol
B: ethanol
C: 2-propanol
D: 1-propanol
E: 1-butanol
F: 1-methoxy-2-propanol
G: 3-methoxy-3-methyl-1-butanol
H: 3-methoxy-3-methyl-1-butylacetate
MIBK: methyl isobutyl ketone
KP-341: leveling agent (manufactured by Shin-Etsu Chemical Co., Ltd.)
BYK-378_10%: leveling agent (manufactured by BYK Japan KK)

Subsequently, the coating solution according to Example 23 was applied to the antifog layer through spin coating, and the coating solutions according to Examples 24 to 27 were applied to the antifog layer through roll coating. The obtained coating films had good appearances and were uniform right after the application. Thereafter, the coating films were dried at 120° C. for 10 minutes in a heating furnace. Thus, cover members according to Examples 24 to 27 were obtained.

Antifog performance was evaluated by blowing expired air onto the second functional layers of the cover members of Examples 24 to 27 formed as described above, and it was found that none of the cover members were fogged.

Figure 11:
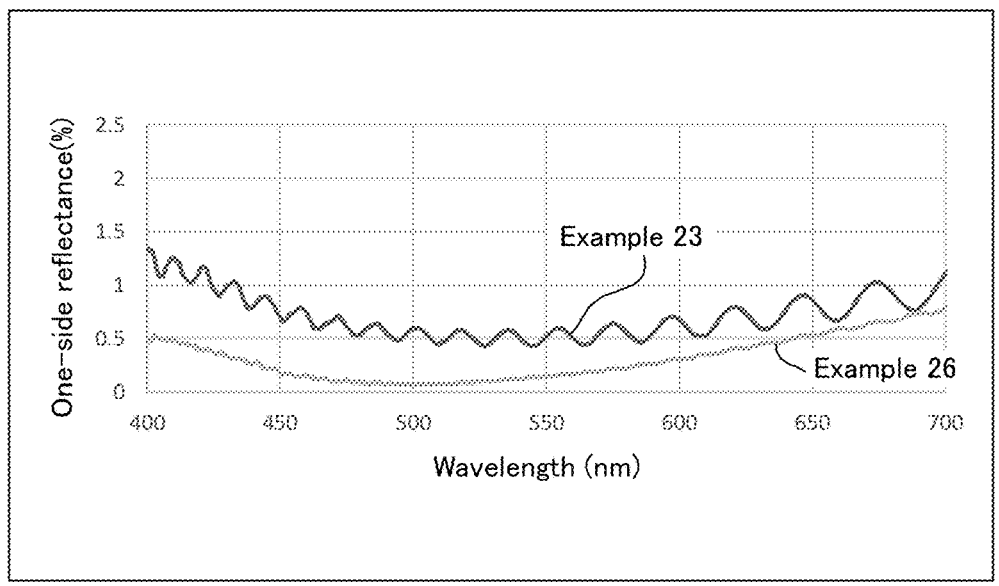
FIG. 11 is a graph showing one-side reflectances of Examples 23 and 26.

Next, the one-side reflectance was measured for Examples 23 and 26. Results are shown in FIG. 11. The cover member of Example 23 had an average visible light reflectance of 0.71%, and the cover member of Example 26 had an average visible light reflectance of 0.31%. A cover member that did not include the second functional layer and was provided with only the antifog layer had a reflectance of 4% to 5%, although this is not shown in FIG. 11. Accordingly, it was found that the reflectance was significantly reduced in the cover members of Examples 23 and 26.

Examples 28 to 30

The following cover members were produced as Examples 28 to 30. First, an antifog film (manufactured by FUJIFILM Corporation, model number: MF-600) was prepared. This film included a TAC (triacetylcellulose) film and a PET film attached to each other via a sticky layer to form a single piece. The TAC film included a modified layer (antifog layer) that was formed by modifying the surface of the TAC film so as to have an antifog property. Specifically, a film having the following configuration was prepared. Protective film (PE: 60 μm)/modified TAC layer (5 μm)/TAC (120 μm)/sticky layer (15 μm)/PET (50 μm)/sticky layer (25 μm)/protective film (PET: 38 μm)

Next, the modified TAC layer side protective film (PE: 60 μm) was removed and corona discharge treatment was performed (model number: corona master PS-1M, manufactured by Shinko Electric & Instrumentation Co., Ltd., 14.5 kW) on the surface of the modified TAC layer. The coating solution of Example 21 was applied to the surface subjected to the corona discharge treatment through spin coating (5000 rpm, 20 seconds, room temperature) (Example 28). Then, the film was fired at 120° C. for 10 minutes. The one-side reflectance of the surface provided with the antireflection layer was measured using a reflectance measurement device (model number: USPM-RU III, manufactured by Olympus Corporation). With this device, spectral reflectance can be measured with high accuracy without being affected by reflected light from the back surface. A refractive index calculated from the reflectance measured using the reflectance measurement device was 1.2382, and the film thickness was 107 nm (Table 11). Furthermore, antireflection layers having different thicknesses were formed on the film by changing the rotational frequency in spin coating (Examples 29 and 30).

After the antireflection films were each formed on the modified TAC layer (antifog layer) as described above, the sticky layer side protective film (PET: 38 μm) was removed and the sticky layer was attached to a glass substrate (product name: Glanova, manufactured by Nippon Sheet Glass Co., Ltd., thickness: 2.1 mm). Thus, cover members according to Examples 28 to 30 were completed. Next, the cover members were evaluated as described below.

TABLE 11

| | Ex. 28 | Ex. 29 | Ex. 30 |
|---|---|---|---|
| Rotational frequency (rpm) in spin coating | 5000 | 6000 | 6000 |
| Firing temperature (° C.) | 120 | 120 | 120 |

TABLE 11-continued

|  | Ex. 28 | Ex. 29 | Ex. 30 |
| --- | --- | --- | --- |
| Film thickness (nm) | 107 | 102 | 109 |
| Refractive index | 1.2382 | 1.2216 | 1.2355 |

Figure 12:
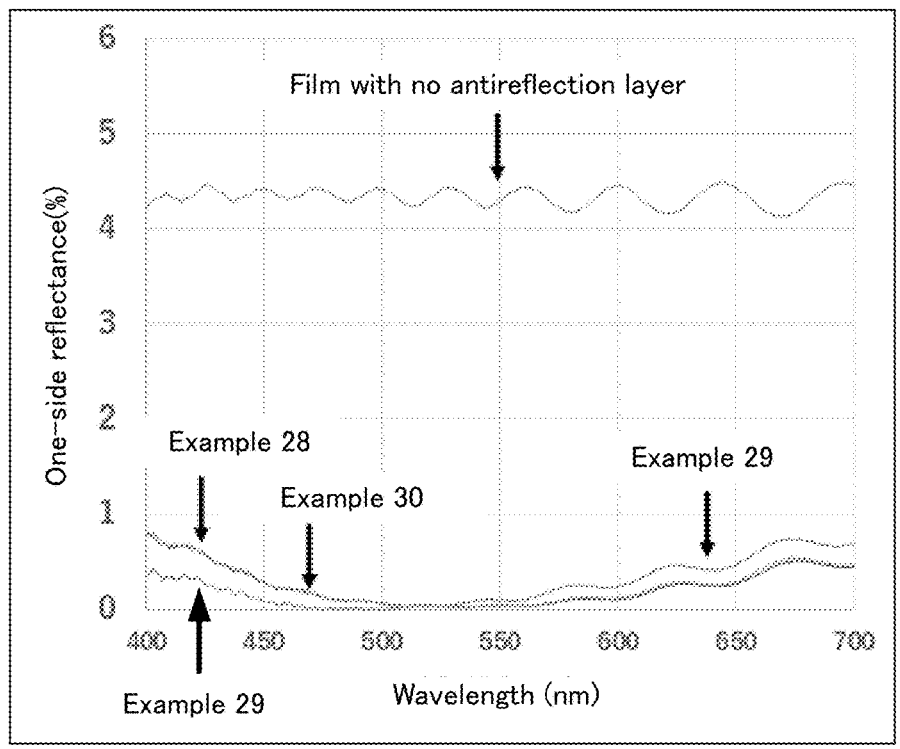
FIG. 12 is a graph showing one-side reflectances of films of Examples 28 to 30, on which antireflection films were formed, in the range of 400 to 700 nm.

FIG. 12 shows one-side reflectances of the films provided with the antireflection films of Examples 28 to 30 in the range from 400 to 700 nm. The one-side reflectance of a film that was not provided with an antireflection film is shown as "film with no antireflection layer". As is clear from FIG. 12, the one-side reflectance in the case where the antireflection film according to the present invention was not formed, i.e., the one-side reflectance of the antifog layer (modified TAC layer) was 4% or more, but in the cases where the antireflection film was formed on the antifog layer (modified TAC layer) as in Examples 28 to 30, the one-side reflectance was less than 1% in the range from 400 to 700 nm, and a remarkable antireflection effect was confirmed.

Furthermore, antifog performance was evaluated by blowing expired air onto the antifog layers provided with the antireflection films of Examples 28 to 30, and it was found that none of the antifog layers were fogged.

C. Variations

Although embodiments of the present invention have been described, the present invention is not limited to the above embodiments, and various changes can be made without departing from the gist of the present invention. The following variations can be combined as appropriate.
<1>

The substrate 1 may be formed from a composite material constituted by a resin material and a glass plate, or laminated glass obtained by sandwiching an interlayer between two glass plates.
<2>

The substrate 1 may be a mirror that includes an antiglare layer (or a surface subjected to antiglare treatment), for example.

A film on a mirror often peels off from positions where the hand of a user touches, and the mirror is often used for a long period, and accordingly, the mirror is required to have durability against peeling of the film on the surface. When an antifog layer is directly applied to the mirror, which is the substrate, the antifog layer and the substrate (glass plate) are firmly bonded via siloxane bonds as described above, and therefore, high durability can be expected even when the mirror is used for a long period.

Also, when the mirror is used in a bathroom or a washstand, the mirror is used in a particularly high-humidity environment, and accordingly, a high antifog performance is required. On the other hand, if the antifog layer only has the water absorbing property, when the amount of absorbed water exceeds a saturation amount, waterdrops are generated on the surface of the antifog layer and the mirror may be clouded. When the above-described hydrophilic layer is formed on the surface of the antifog layer, a water layer is formed on the surface of the hydrophilic layer when the moisture absorbing layer has been saturated, and therefore, even in the high-humidity environment, it is possible to avoid a situation in which the mirror is clouded and a reflected image cannot be seen. When the water layer is formed, the contact angle of water becomes 20° or less. Not only the hydrophilic layer, but also a water repellent layer may be formed. The water repellent layer referred to here is a layer on which the contact angle of water is 90° or less.

In the case where a mirror is used as the substrate, it is preferable to layer an antifog layer that does not include the above-described substrate film made of PET or the like, on the substrate. When the substrate film is not used, distortion that occurs due to the substrate film can be prevented. Particularly in the case of a mirror, reflected images need to be clear and distortion of the images needs to be suppressed to a high degree. Also, light that is incident on the mirror and light that is reflected by the mirror pass through the antifog layer. That is, light passes through the antifog layer twice, and accordingly, an antifog layer that does not include the substrate film is particularly advantageous in terms of suppressing distortion. It should be noted that when the antifog layer has a constant thickness of 1 to 20 μm, flexural rigidity is 1 to 4 GPa, and therefore, the antifog layer is easy to handle even when the substrate film made of PET or the like is not used. Also, an antifog layer having higher tensile strength can be used more suitably.
<3>

In the second embodiment described above, an example in which the second functional layer that is an antireflection layer is layered on the first functional layer is described, but such an antireflection layer can also be layered as the first functional layer directly on the substrate 1. In this case, the first functional layer may be layered directly on the substrate, or a sheet material that includes a sticky layer, a substrate sheet, and the first functional layer layered in this order may be prepared and the sticky layer may be attached to the substrate. In this case, the substrate sheet can be formed from polyethylene terephthalate, polyvinyl chloride, polyvinylidene chloride, polycarbonate, or acrylic resin, for example. The sticky layer is only required to be capable of fixing the substrate sheet to the substrate 1 with sufficiently high strength. Specifically, it is possible to use a sticky layer made of an acrylic resin or a rubber resin having stickiness at normal temperature, or a resin that is obtained by copolymerizing a methacrylic monomer and an acrylic monomer and setting the glass transition temperature to a desired temperature, for example. The antireflection layer can contain a second solvent that has a boiling point that is higher than the boiling point of water and not higher than temperatures to which the substrate sheet is resistant.

The first functional layer that serves as the antireflection layer may also be constituted by two layers. That is, the first functional layer may be configured similarly to the second functional layer 3 described with reference to FIG. 8.
<4>

Figure 13:
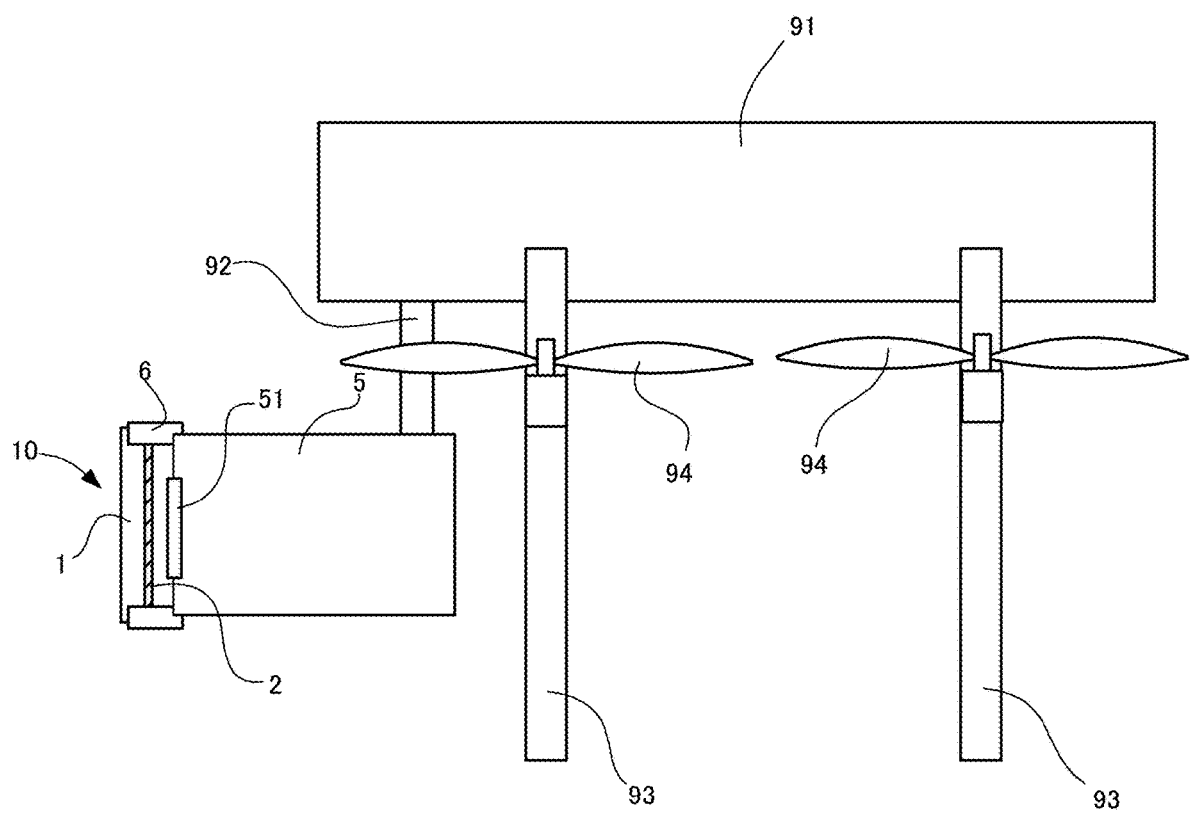
FIG. 13 is a side view showing a schematic configuration of a drone.

The cover members described above can be used in wirelessly controlled flying objects, i.e., drones, for example. FIG. 13 is a schematic side view of a drone. As shown in FIG. 13, the drone includes a main body portion 91 that extends in the front-rear direction, an image capturing apparatus 5 that is attached to a leading end of a support member 92 extending downward from a front portion of the main body portion 91, two leg portions 93 attached to the left side surface of the main body portion, two leg portions 93 attached to the right side surface of the main body portion, and propellers 4 respectively provided at upper ends of the leg portions 93. A driving source for the propellers 4, a control device for controlling the flight and the like, a communication device, and the like are included in the main body portion 91. The image capturing apparatus 5 includes a lens 51, and a cover member 10 is attached in front of the lens. The cover member 10 is provided with a bracket 6 for attaching the cover member to the lens 51. A closed space is formed in front of the lens 51 by the cover member 10 and the bracket 6. In this case, the cover member 10 is arranged such that the first main surface 11 of the substrate 1 faces the closed space. Since the first functional layer 2 is layered on the first main surface 11, the first main surface 11 can be kept from fogging due to a temperature difference or an air pressure difference between the closed space and the outside thereof. In particular, a drone sometimes flies while repeatedly climbing and descending, and therefore, the above-described changes in the temperature and the air pressure may be large. Therefore, the cover member 10 is likely to fog. When the cover member according to the present embodiment is used as the cover member for an image capturing apparatus that is mounted on a drone, it is possible to prevent problems that would be caused by fogging of the cover member when capturing an image.

The drone shown in FIG. 13 is an example, and the cover member can be used in any known drones to which an image capturing apparatus is attached. For example, some drones are capable of traveling under water, and the cover member according to the present embodiment can also be used in such drones. That is, the temperature and the air pressure may significantly change when traveling under water, and accordingly, the cover member can be used suitably. Also, all the cover members described in the present specification can be used as the cover member 10.

The cover member is applicable to not only drones but also various movable bodies excluding conventional automobiles, airplanes, helicopters, ships, and submarines. That is, the image capturing apparatus and the cover member described above can be mounted on a manned or unmanned movable body of which the control method is selected from wireless control, autonomous control, direct manual control, and a combination of any of these, and that is at least any of a flying object and movable objects that travel on the ground, above water, or under water.

| Reference Signs List | |
|---|---|
| 1 | Substrate |
| 11 | First main surface |
| 12 | Second main surface |
| 2 | First functional layer |
| 3 | Second functional layer |

The invention claimed is:

1. A transparent laminate comprising:
a transparent substrate that has a first main surface and a second main surface;
a transparent first functional layer that is layered on the first main surface of the substrate; and
a second functional layer that is layered on the first functional layer and is permeable to moisture;
wherein the first functional layer has an antifog function;
wherein the second functional layer contains hollow particles and a binder that binds the hollow particles together; and
wherein the binder contains polysilsesquioxane.

2. The transparent laminate according to claim 1, wherein the first functional layer has a surface roughness Ra of 1 to 1000 nm.

3. The transparent laminate according to claim 1, wherein the first functional layer includes:
a substrate film that has a first main surface and a second main surface;
a sticky layer that is layered on the second main surface of the substrate film; and
an antifog layer that is layered on the first main surface of the substrate film, and
the substrate film is fixed to the first main surface of the substrate via the sticky layer.

4. The transparent laminate according to claim 3, wherein the antifog layer includes a moisture absorbing layer that contains a hygroscopic resin material.

5. The transparent laminate according to claim 4, wherein the antifog layer includes the moisture absorbing layer and a hydrophilic layer that is layered on the moisture absorbing layer and is hydrophilic.

6. The transparent laminate according to claim 1, wherein the first functional layer includes a sticky layer and an antifog layer, and
the antifog layer is fixed to the first main surface of the substrate via the sticky layer.

7. The transparent laminate according to claim 1, wherein the first functional layer includes an antifog layer, and
the antifog layer is layered on the first main surface of the substrate.

8. The transparent laminate according to claim 1, wherein the first functional layer contains an inorganic compound as a main component.

9. The transparent laminate according to claim 8, wherein the first functional layer contains inorganic microparticles and an inorganic binder.

10. The transparent laminate according to claim 1, wherein the first functional layer is formed from an organic-inorganic composite material, and
the refractive index of the second functional layer is lower than the refractive index of the first functional layer.

11. The transparent laminate according to claim 1, wherein the first functional layer has an antireflection function.

12. The transparent laminate according to claim 11, wherein the first functional layer is formed from a film in which a sticky layer, a substrate sheet, and an antireflection layer are layered in this order.

13. The transparent laminate according to claim 12, wherein the antireflection layer included in the first functional layer has a refractive index of 1.10 to 1.45.

14. The transparent laminate according to claim 12, wherein the antireflection layer included in the first functional layer contains hollow particles and a binder that binds the hollow particles together.

15. The transparent laminate according to claim 1, wherein the substrate is glass.

16. The transparent laminate according to claim 1, wherein the substrate is float glass produced using a float process, and the concentration of tin oxide in the first main surface is lower than the concentration of tin oxide in the second main surface.

17. The transparent laminate according to claim 1, wherein the substrate is float glass produced using a float process, and the concentration of tin oxide in the first main surface is higher than the concentration of tin oxide in the second main surface.

18. The transparent laminate according to claim 1, further comprising
a third functional layer that is layered on the second main surface of the substrate.

* * * * *